United States Patent

Horne et al.

[11] Patent Number: 6,136,287
[45] Date of Patent: Oct. 24, 2000

[54] LITHIUM MANGANESE OXIDES AND BATTERIES

[75] Inventors: Craig R. Horne, San Francisco; Sujeet Kumar, Fremont; Hariklia Dris Reitz, Santa Clara; James T. Gardner, Cupertino; Xiangxin Bi, San Ramon, all of Calif.

[73] Assignee: NanoGram Corporation, Fremont, Calif.

[21] Appl. No.: 09/203,414

[22] Filed: Dec. 2, 1998

Related U.S. Application Data

[63] Continuation-in-part of application No. 09/188,768, Nov. 9, 1998.

[51] Int. Cl.[7] .................................................. C01G 45/12
[52] U.S. Cl. ........................ 423/599; 423/179.5; 429/224
[58] Field of Search .................................. 423/599, 179.5; 429/224

[56] References Cited

U.S. PATENT DOCUMENTS

| | | | |
|---|---|---|---|
| 4,828,834 | 5/1989 | Nagaura et al. | 429/194 |
| 4,959,282 | 9/1990 | Dahn et al. | 429/224 |
| 4,980,251 | 12/1990 | Thackeray et al. | 429/224 |
| 5,013,706 | 5/1991 | Schramm et al. | 502/309 |
| 5,153,081 | 10/1992 | Thackeray et al. | 429/194 |
| 5,211,933 | 5/1993 | Barboux et al. | 423/596 |
| 5,425,932 | 6/1995 | Tarascon | 423/599 |
| 5,478,672 | 12/1995 | Mitate | 429/194 |
| 5,561,006 | 10/1996 | Lecerf et al. | 429/218 |
| 5,601,796 | 2/1997 | Frech et al. | 423/599 |
| 5,604,057 | 2/1997 | Nazri | 429/224 |
| 5,641,465 | 6/1997 | Ellgen et al. | 423/50 |
| 5,641,468 | 6/1997 | Ellgen | 423/599 |
| 5,677,087 | 10/1997 | Amine et al. | 429/224 |
| 5,695,887 | 12/1997 | Amatucci et al. | 429/48 |
| 5,702,679 | 12/1997 | Sheargold et al. | 423/599 |
| 5,738,957 | 4/1998 | Amine et al. | 429/223 |
| 5,759,717 | 6/1998 | Amine et al. | 429/218 |
| 5,759,720 | 6/1998 | Amatucci | 429/224 |
| 5,770,018 | 6/1998 | Saidi | 204/157.15 |
| 5,783,332 | 7/1998 | Amine et al. | 429/218 |
| 5,807,646 | 9/1998 | Iwata et al. | 429/224 |
| 5,874,058 | 2/1999 | Sheargold et al. | 423/599 |
| 5,883,032 | 3/1999 | Bogdan et al. | 502/66 |
| 5,958,361 | 9/1999 | Laine et al. | 423/592 |
| 5,965,293 | 10/1999 | Idota et al. | 429/218.1 |

FOREIGN PATENT DOCUMENTS

| | | |
|---|---|---|
| 0 820 113 A1 | 1/1998 | European Pat. Off. . |
| 0 837 036 A1 | 4/1998 | European Pat. Off. . |
| 2 299 988 | 10/1996 | United Kingdom . |
| WO 96/12676 | 5/1996 | WIPO . |
| WO 97/20773 | 6/1997 | WIPO . |
| WO 97/37935 | 10/1997 | WIPO . |

OTHER PUBLICATIONS

"Modeling a Porous Intercalation Electrode with Two Characteristic Particle Sizes" by, Darling et al., J. Electrochem. Soc., vol. 144, No., 12, Dec. 1997, pp. .4201–4207.

"Nanocomposite Manganese Oxides for Rechargeable Lithium Batteries" by, J. Kim et al., Electrochemicals and Solid–State Letters, 1 (5) 207–209 (Sep. 1998).

"Relationsohip between Chemical Bonding Nature and Electrochemical Property of $LiMn_2O_4$ Spinel Oxides with Various Particle Sizes: "Electrochemical Grafting" Concept" by, Nadine Treuil et al., J. Phys. Chem. B., Mar. 1999, 103, 2100–2106.

*Primary Examiner*—Tom Dunn
*Assistant Examiner*—Cam N. Nguyen
*Attorney, Agent, or Firm*—Westman, Champlin & Kelly, P.A.; Peter S. Dardi

[57] ABSTRACT

Lithium manganese oxide particles have been produced with an average diameter less than about 250 nm. The particles have a high degree of uniformity. The particles are formed by the heat treatment of nanoparticles of manganese oxide. The lithium manganese oxide particles are useful as active materials in the positive electrodes of lithium based batteries. Improved batteries result from the use of the uniform nanoscale lithium manganese oxide particles.

22 Claims, 26 Drawing Sheets

NANOPARTICLES OUT

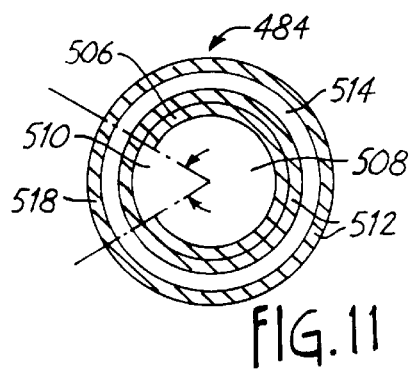
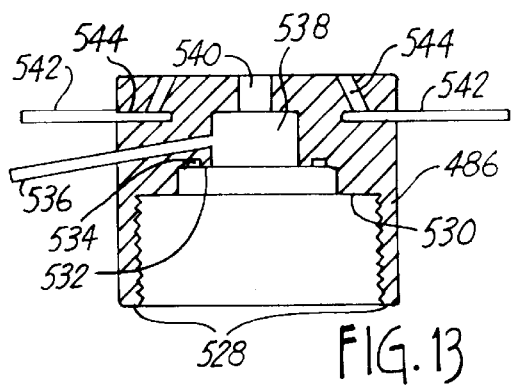
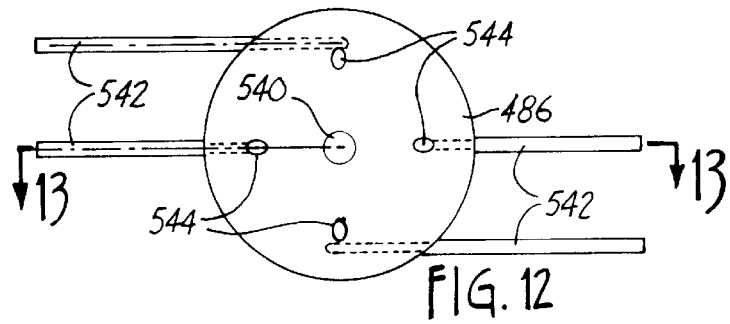
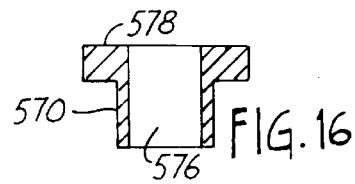
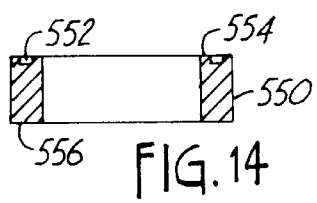
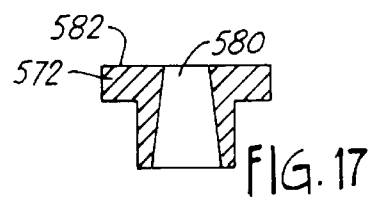
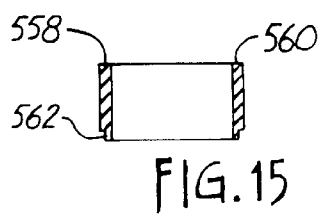
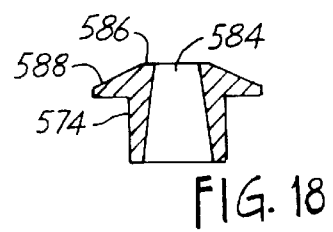

LITHIUM MANGANESE OXIDES AND BATTERIES

CROSS REFERENCE TO RELATED APPLICATIONS

This application is a continuation-in-part of copending U.S. Patent Application to Kumar et al. Ser. No. 09/188,768, entitled "Composite Metal Oxide Particles," filed on Nov. 9, 1998, incorporated herein by reference.

BACKGROUND OF THE INVENTION

The invention relates to lithium manganese oxide particles with an average diameter less than a micron. The invention further relates to methods of producing lithium manganese oxide particles by a heat treatment. The invention also relates to batteries formed with lithium manganese oxide particles.

The microminiaturization of electronic components has created widespread growth in the use of portable electronic devices such as cellular phones, pagers, video cameras, facsimile machines, portable stereophonic equipment, personal organizers and personal computers. The growing use of portable electronic equipment has created ever increasing demand for improved power sources for these devices. Relevant batteries include primary batteries, i.e., batteries designed for use through a single charging cycle, and secondary batteries, i.e., batteries designed to be rechargeable. Some batteries designed essentially as primary batteries may be rechargeable to some extent.

Batteries based on lithium have been the subject of considerable development effort and are being sold commercially. Lithium based batteries generally use electrolytes containing lithium ions. The negative electrodes for these batteries can include lithium metal or alloy (lithium batteries), or compositions that intercalate lithium (lithium ion batteries). Preferred electroactive materials for incorporation into the positive electrodes are compositions that intercalate lithium. The compositions that intercalate lithium, for use in the positive electrodes, generally are chalcogenides such as metal oxides that can incorporate the lithium ions into their lattice.

Manganese oxides and lithium manganese oxides with various stoichiometries have been noted as promising materials for use in positive electrodes for lithium based batteries. In particular, appropriate manganese oxides can intercalate lithium ions into their crystal structure to form lithium manganese oxides. Lithium manganese oxides are useful for the production of lithium based secondary batteries. Because of the interest in lithium manganese oxides, several approaches have been developed for producing lithium manganese oxide powders.

SUMMARY OF THE INVENTION

In a first aspect, the invention pertains to a collection of particles comprising lithium manganese oxide, the collection of particles having an average diameter less than about 250 nm.

In another aspect, the invention pertains to a method of making lithium manganese oxide particles comprising heating a mixture of manganese monoxide (MnO) particles and a lithium compound.

Moreover, the invention pertains to a method of making lithium manganese oxide particles comprising heating a mixture of particles of a manganese compound and a lithium compound at a temperature less than about 600° C., the particles of manganese compound having an average diameter less than about 500 nm.

In a further aspect, the invention features a battery comprising lithium manganese oxide particles having an average diameter less than about 250 nm.

In another aspect, the invention features a battery comprising lithium manganese oxide, the battery having a four volt profile with a cycling stability within about 20 percent of initial values after 25 cycles.

In addition, the invention features a battery comprising lithium manganese oxide, the battery having an initial capacity greater than 120 mAh\g. dr

BRIEF DESCRIPTION OF THE DRAWINGS

FIG. 11 is a top view of the mount of the reactant delivery apparatus of FIG. 9.

FIG. 12 is a top view of a cap of the aerosol delivery apparatus of FIG. 9.

FIG. 13 is a sectional view of the cap of FIG. 12 taken along line 13—13.

FIG. 14 is a sectional side view of a spacer used in the aerosol delivery apparatus of FIG. 9, where the cross section is taken through the center of the spacer.

FIG. 15 is a sectional side view of a shim used in the aerosol delivery apparatus of FIG. 9, where the cross section is taken through the center of the shim.

FIG. 16 is a sectional, side view of an embodiment of a brushing cap for use in the aerosol delivery apparatus of FIG. 9, where the cross section is taken through the center of the brushing cap.

FIG. 17 is a sectional, side view of an alternative embodiment of a brushing cap for use in the aerosol delivery apparatus of FIG. 9, where the cross section is taken through the center of the brushing cap.

FIG. 18 is a sectional, side view of a second alternative embodiment of a brushing cap for use in the aerosol delivery apparatus of FIG. 9, where the cross section is taken through the center of the brushing cap.

DETAILED DESCRIPTION OF THE PREFERRED EMBODIMENTS

Figure 1:
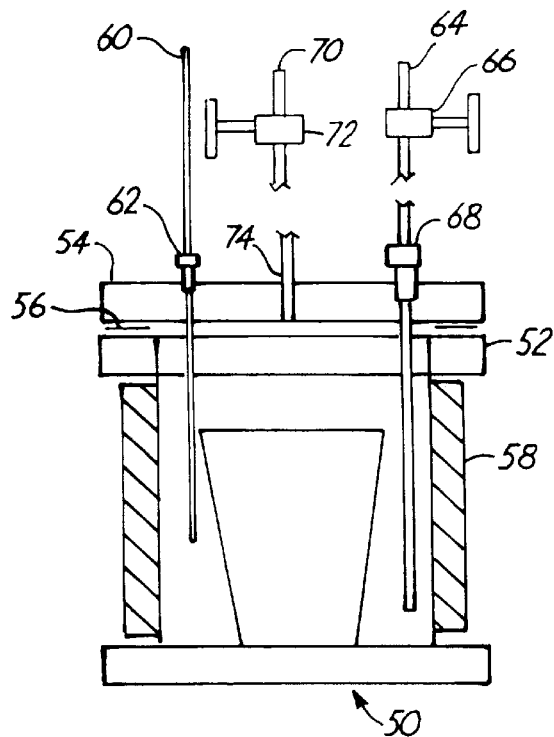
FIG. 1 is a schematic sectional view of a solid precursor delivery system taken through the center of the system.

It has been discovered that nanoscale manganese oxides provide a suitable starting material for the formation of nanoscale lithium manganese oxides. In particular, lithium manganese oxides with an average diameter less than a micron can be formed with a spinel crystal structure by thermal processing approaches with nanoscale manganese oxide starting materials. The use of a nanoscale starting material allows for the use of very mild temperatures in the processing. The resulting nanoscale lithium manganese oxide spinels provide an excellent material for the formation of lithium based batteries.

Alternatively, lithium manganese oxide nanoparticles can be formed by laser pyrolysis. The lithium manganese oxide particles produced by laser pyrolysis can be heated under mild conditions to anneal the particles producing a spinel crystal structure. Thus, two alternative approaches have been found to produce lithium manganese oxide nanoparticles.

More specifically, in a first approach the lithium manganese oxide particles are formed by heating a mixture of nanoscale manganese oxide particles and a lithium compound. During the heating step the lithium is incorporated into the manganese oxide lattice. The manganese oxide particles for thermal lithium incorporation can have a variety of stoichiometries including, surprisingly, MnO. The heating can be performed either under an oxidizing atmosphere or under an inert atmosphere. Due to the nanoscale character of the manganese oxide starting material, the heating can be performed under surprisingly mild conditions. Under these mild reaction conditions, lithium manganese oxide particles are formed that have an average diameter less than a micron.

A preferred approach for the formation of suitable nanoscale manganese oxide particles for lithiation involves laser pyrolysis. In particular, laser pyrolysis is an excellent process for efficiently producing manganese oxide particles with a narrow distribution of average particle diameters. A basic feature of successful application of laser pyrolysis for the production of manganese oxide nanoparticles is the generation of a reactant stream containing a manganese precursor compound, a radiation absorber and a secondary reactant. The secondary reactant can be an oxygen source. The reactant stream is pyrolyzed by an intense laser beam. As the reactant stream leaves the laser beam, the particles are rapidly quenched.

To perform laser pyrolysis, reactants can be supplied in vapor form. Alternatively, one or more reactants can be supplied as an aerosol. The use of an aerosol provides for the use of a wider range of metal precursors for laser pyrolysis than are suitable for vapor delivery only. Thus, less expensive precursors can be used with aerosol delivery. Suitable control of the reaction conditions with the aerosol results in nanoscale particles with a narrow particle size distribution.

As an alternative to producing lithium manganese oxide nanoparticles by the thermal processing of manganese oxide particles, lithium manganese oxide particles having diameters substantially less than a micron have been produced directly by laser pyrolysis. For the direct production of lithium/manganese composite materials, laser pyrolysis preferably involves an aerosol based reactant delivery apparatus. Heat processing of the composite particles results in crystalline lithium manganese oxide particles with a spinel crystal structure. The formation of nanoscale lithium manganese oxide directly by laser pyrolysis is described further in copending and commonly assigned U.S. patent application Ser. No. 09/188,768 to Kumar et al., entitled "Composite Metal Oxide Particles," filed on Nov. 9, 1998, incorporated herein by reference.

As noted above, various forms of lithium manganese oxides can reversibly intercalate lithium atoms and/or ions. The lithium manganese oxide nanoparticles can be incorporated into a positive electrode film with a binder such as a polymer. The film preferably includes additional electrically conductive particles held by the binder along with the lithium manganese oxide particles. The positive electrode film can be used in a lithium battery or a lithium ion battery. The electrolyte for lithium and lithium ion batteries comprises lithium ions.

A. Particle Production Using Laser Pyrolysis

Laser pyrolysis has been discovered to be a valuable tool for the production of nanoscale manganese oxide particles for further processing into lithium manganese oxide or for the direct production of lithium manganese oxide particles. Manganese oxide nanoparticles produced by laser pyrolysis are a preferred starting material for the lithium incorporation process described herein involving the mild heating of manganese oxide nanoparticles with a lithium compound. In addition, lithium manganese oxide nanoparticles can be produced directly by laser pyrolysis, where heating can be used to alter and/or improve the characteristics of the resulting particles.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce manganese oxide particles in two particular apparatuses and lithium manganese oxide in the first particular apparatus are described below in the Examples. Furthermore, some general observations on the relationship between reaction conditions and the resulting particles can be made.

Increasing the laser power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant flow rate and velocity of the reactant gas stream are inversely related to particle size so that increasing the reactant gas flow rate or velocity tends to result in smaller particle sizes. Also, the growth dynamics of the particles have a significant influence on the size of the resulting particles. In other words, different forms of a product compound have a tendency to form different size particles from other phases under relatively similar conditions. Laser power also influences particle size with increased laser power favoring larger particle formation for lower melting materials and smaller particle formation for higher melting materials.

Laser pyrolysis has been performed generally with gas phase reactants. The use of exclusively gas phase reactants is somewhat limiting with respect to the types of precursor compounds that can be used. Thus, techniques have been developed to introduce aerosols containing reactant precursors into laser pyrolysis chambers. Improved aerosol delivery apparatuses for reactant systems are described further in commonly assigned and copending U.S. patent application Ser. No. 09/188,670 to Gardner et al., entitled "Reactant Delivery Apparatuses," filed Nov. 9, 1998, incorporated herein by reference.

Using aerosol delivery apparatuses, solid precursor compounds can be delivered by dissolving the compounds in a solvent. Alternatively, powdered precursor compounds can be dispersed in a liquid\solvent for aerosol delivery. Liquid precursor compounds can be delivered as an aerosol from a neat liquid, a multiple liquid dispersion or a liquid solution, if desired. Aerosol reactants can be used to obtain a significant reactant throughput. The solvent, if any, can be selected to achieve desired properties of the solution. Suitable solvents include water, methanol, ethanol, isopropyl alcohol, other organic solvents and mixtures thereof. The solvent should have a desired level of purity such that the resulting particles have a desired purity level. For the production of composite metal oxide particles by laser pyrolysis, a plurality of metal compounds can be included in the solution. Alternatively or additionally, metal precursors can be delivered into the reaction chamber in the vapor state in addition to the metal precursors delivered as an aerosol.

If aerosol precursors are formed with a solvent present, the solvent is rapidly evaporated by the laser beam in the reaction chamber such that a gas phase reaction can take place. Thus, the fundamental features of the laser pyrolysis reaction is unchanged. However, the reaction conditions are affected by the presence of the aerosol. Below, examples are described for the production of manganese oxide nanoparticles using gaseous reaction precursors and aerosol precursors using two different laser pyrolysis reaction chambers. The production of lithium manganese oxide nanoparticles by laser pyrolysis in one of these reaction chambers using aerosol precursors is also described in the Examples. Thus, the parameters associated with aerosol reactant delivery can be explored based on the description below.

A number of suitable solid, manganese precursor compounds can be delivered as an aerosol from solution. For example, manganese chloride ($MnCl_2$) and hydrated manganese chloride ($MnCl_2.H_2O$) are soluble in water and alcohols, and manganese nitrate ($Mn(NO_3)_2$) is soluble in water and certain organic solvents. Also, suitable lithium precursors for aerosol delivery from solution include, for example, lithium chloride (LiCl), which is somewhat soluble in water, alcohol and some other organic solvents, and lithium nitrate ($LiNO_3$), which is somewhat soluble in water and alcohol.

The compounds are dissolved in a solution preferably with a concentration greater than about 0.5 molar. Generally, the greater the concentration of precursor in the solution the greater the throughput of reactant through the reaction chamber. As the concentration increases, however, the solution can become more viscous such that the aerosol has droplets with larger sizes than desired. Thus, selection of solution concentration can involve a balance of factors in the selection of a preferred solution concentration. For the formation of composite metal particles, the relative amounts of metal precursors in the solution effects the relative amounts of metals in the resulting particles. Thus, the desired composition of the product particles influences the selection of the relative amounts of metal precursors for delivery.

Appropriate manganese precursor compounds for gaseous delivery generally include manganese compounds with reasonable vapor pressures, i.e., vapor pressures sufficient to get desired amounts of precursor vapor in the reactant stream. The vessel holding liquid or solid precursor compounds can be heated to increase the vapor pressure of the manganese precursor, if desired. Suitable solid, manganese precursors with sufficient vapor pressure of gaseous delivery include, for example, manganese carbonyl ($Mn_2(CO)_{10}$). A suitable container for heating and delivering a solid precursor to a laser pyrolysis apparatus is shown in FIG. 1.

Referring to FIG. 1, the solid precursor delivery system 50 for vapor delivery includes a container 52 and a lid 54. A gasket 56 is located between container 52 and lid 54. In one preferred embodiment, container 52 and lid 54 are made from stainless steel, and gasket 56 is made from copper. In this embodiment, lid 54 and gasket 56 are bolted to container 52. Other inert materials, such as Pyrex®, suitable for the temperatures and pressures applied to the solid precursor system can be used. Container 52 is surrounded with a band heater 58, which is used to set the temperature of the delivery system 50 at desired values. Suitable band heaters are available from Omega Engineering Inc. Stamford, Conn. The temperature of the band heater can be adjusted to yield a desired vapor pressure of the precursor compound. Additional portions of the precursor delivery system can be heated to maintain the precursor in a vapor state after it has left container 52.

Preferably, a thermocouple 60 is inserted into container 52 through lid 54. Thermocouple 60 can be inserted by way of a Swagelok® fitting 62 or other suitable connection. Tubing 64 provides a input flow of a carrier gas into container 52. Tubing 64 preferably includes a shut off valve 66 and can be inserted through lid 54 by way of a Swagelok® fitting 68 or other suitable connection. Output tube 70 also preferably includes a shut off valve 72. Output tube 70 preferably enters into container 52 through lid 54 at a sealed connection 74. Tubes 64 and 70 can be made of any suitable inert material such as stainless steel. A solid precursor can be placed directly within container 52 or it can be placed within a smaller, open container within container 52.

Preferred secondary reactants serving as oxygen source include, for example, $O_2$, $CO$, $CO_2$, $O_3$ and mixtures thereof. The secondary reactant compound should not react significantly with the manganese precursor and/or lithium precursor prior to entering the reaction zone since this generally would result in the formation of large particles.

Laser pyrolysis can be performed with a variety of optical frequencies. Preferred light sources operate in the infrared portion of the electromagnetic spectrum. $CO_2$ lasers are particularly preferred sources of light. Infrared absorbers for inclusion in the molecular stream include, for example, $C_2H_4$, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the light beam increases the temperature at a tremendous rate, many times the rate that heat generally would be produced even by strongly exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. Appropriate shielding gases include, for example, Ar, He and $N_2$.

An appropriate laser pyrolysis apparatus generally includes a reaction chamber isolated from the ambient environment. A reactant inlet connected to a reactant supply system produces a reactant stream through the reaction chamber. A laser beam path intersects the reactant stream at a reaction zone. The reactant stream continues after the reaction zone to an outlet, where the reactant stream exits the reaction chamber and passes into a collection system. Generally, the laser is located external to the reaction chamber, and the light beam enters the reaction chamber through an appropriate window.

Two laser pyrolysis reaction chambers are described further below. These laser pyrolysis reaction chambers can be configured for delivery of gas phase reactants and/or aerosol reactants.

1. First Laser Pyrolysis Reaction Chamber

Figure 2:
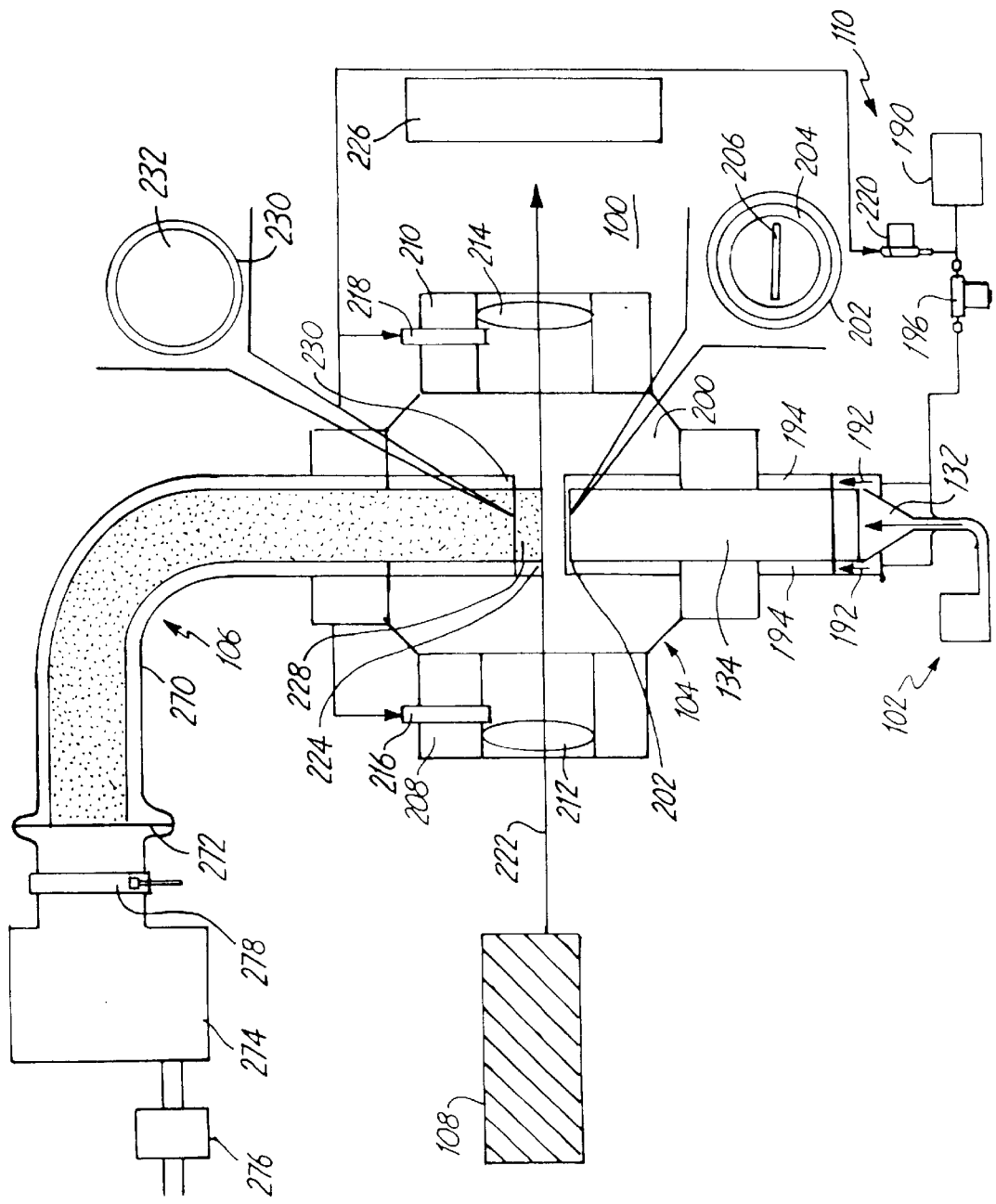
FIG. 2 is a schematic, sectional view of an embodiment of a laser pyrolysis apparatus, where the cross section is taken through the middle of the laser radiation path. The upper insert is a bottom view of the collection nozzle, and the lower insert is a top view of the injection nozzle.

Referring to FIG. 2, a particular embodiment 100 of a laser pyrolysis apparatus involves a reactant supply system 102, reaction chamber 104, collection system 106, laser 108 and shielding gas delivery system 110. Two alternative reaction supply systems can be used with the apparatus of FIG. 2. The first reaction supply system is used to deliver exclusively gaseous reactants. The second reactant supply system is used to deliver one or more reactants as an aerosol.

Figure 3:
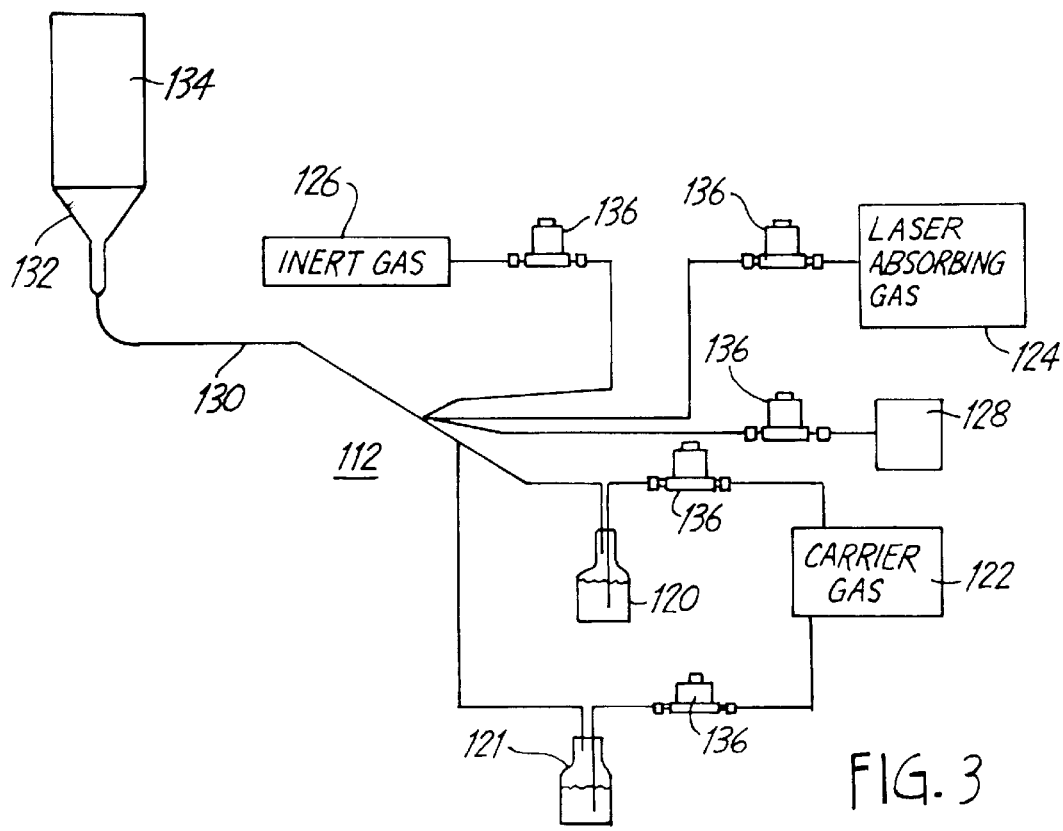
FIG. 3 is a schematic, side view of a reactant delivery apparatus for the delivery of vapor reactants to the laser pyrolysis apparatus of FIG. 2.

Referring to FIG. 3, a first embodiment 112 of reactant supply system 102 includes a source 120 of precursor compound. An optional second precursor source 121 can be used for the production of composite particles. For liquid or solid precursors, a carrier gas from one or more carrier gas sources 122 can be introduced into precursor source 120 and/or 121 to facilitate delivery of the precursor as a vapor. Precursor sources 120 and/or 121 can be a solid precursor delivery system 50, as shown in FIG. 1. The carrier gas from source 122 preferably is either an infrared absorber or an inert gas and is preferably bubbled through a liquid precursor compound or delivered into a solid precursor delivery system. Inert gas used as a carrier gas can moderate the reaction conditions. The quantity of precursor vapor in the reaction zone is roughly proportional to the flow rate of the carrier gas.

Alternatively, carrier gas can be supplied directly from infrared absorber source 124 or inert gas source 126, as appropriate. The secondary reactant can be supplied from reactant source 128, which can be a gas cylinder or other suitable container. The gases from the precursor sources 120, 121 are mixed with gases from reactant source 128, infrared absorber source 124 and inert gas source 126 by combining the gases in a single portion of tubing 130. The gases are combined a sufficient distance from reaction chamber 104 such that the gases become well mixed prior to their entrance into reaction chamber 104.

The combined gas in tube 130 passes through a duct 132 into rectangular channel 134, which forms part of an injection nozzle for directing reactants into the reaction chamber. Portions of reactant supply system 112 can be heated to inhibit the deposition of precursor compound on the walls of the delivery system.

Figure 4:
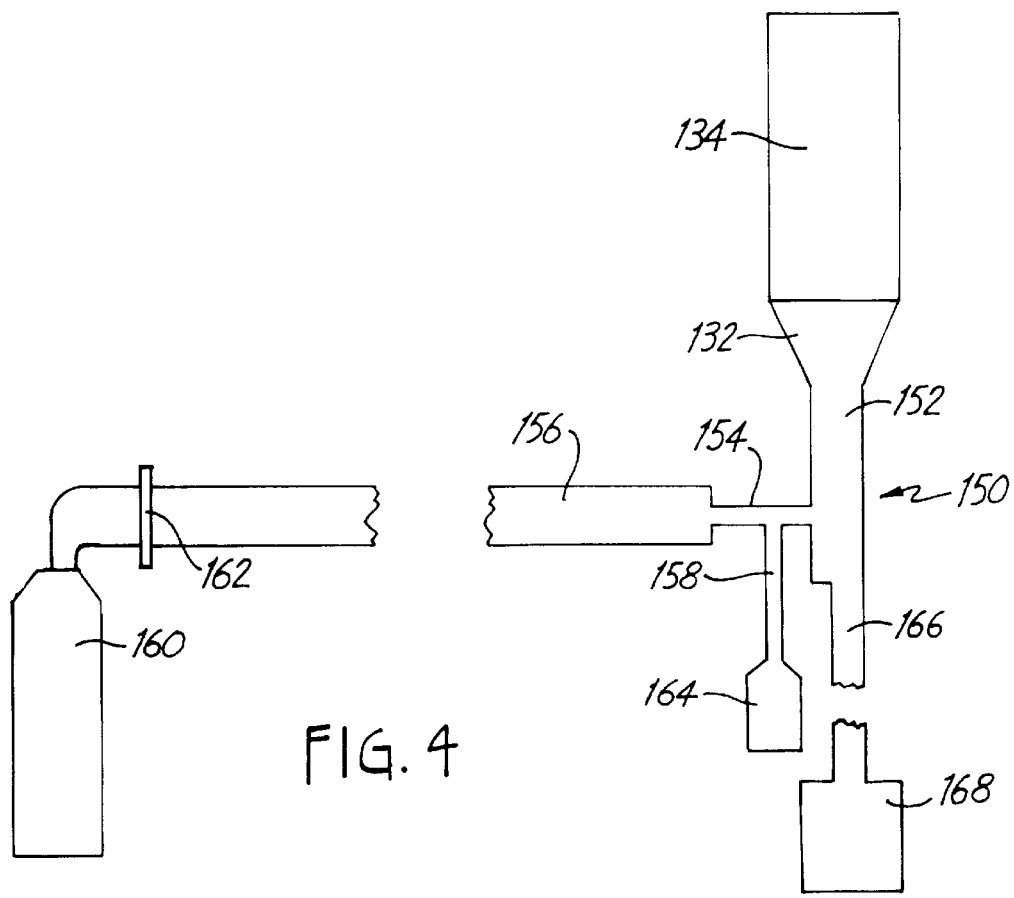
FIG. 4 is schematic, side view of a reactant delivery apparatus for the delivery of an aerosol reactant to the laser pyrolysis apparatus of FIG. 2.

Referring to FIG. 4, a second embodiment 150 of the reactant supply system 102 is used to supply an aerosol to duct 132. Duct 132 connects with rectangular channel 134, which forms part of an injection nozzle for directing reactants into the reaction chamber. Reactant supply system 150 includes a delivery tube 152 that is connected to duct 132. Venturi tube 154 connects to delivery tube 152 as a source of the aerosol. Venturi tube 154 is connected to gas supply tube 156 and liquid supply tube 158.

Gas supply tube 156 is connected to gas source 160. Gas source 160 can include a plurality of gas containers that are connected to deliver a selected gas or gas mixture to gas supply tube 156. The flow of gas from gas source 160 to gas supply tube 156 is controlled by one or more valves 162. Liquid supply tube 158 is connected to liquid supply 164. Delivery tube 152 also connects with drain 166 that flows to reservoir 168.

In operation, gas flow through venturi tube 154 creates suction that draws liquid into venturi tube 154 from liquid supply tube 158. The gas-liquid mixture in venturi tube 154 forms an aerosol when venturi tube 154 opens into delivery tube 152. The aerosol is drawn up into duct 132 by pressure differentials within the system. Any aerosol that condenses within delivery tube 152 is collected in reservoir 168, which is part of the closed system.

Referring to FIG. 2, shielding gas delivery system 110 includes inert gas source 190 connected to an inert gas duct 192. Inert gas duct 192 flows into annular channel 194. A mass flow controller 196 regulates the flow of inert gas into inert gas duct 192. If reactant delivery system 112 is used, inert gas source 126 can also function as the inert gas source for duct 192, if desired.

The reaction chamber 104 includes a main chamber 200. Reactant supply system 102 connects to the main chamber 200 at injection nozzle 202. Reaction chamber 104 can be heated to keep the precursor compound in the vapor state. In particular, the entire reaction chamber 104 preferably is heated to about 120° C. when the vapor of a solid precursor is used. Similarly, the argon shielding gas preferably is heated to about 150° C. when the vapor of a solid precursor is used. The chamber can be examined for condensation to ensure that precursor is not deposited on the chamber.

The end of injection nozzle 202 has an annular opening 204 for the passage of inert shielding gas, and a reactant inlet 206 for the passage of reactants to form a reactant stream in the reaction chamber. Reactant inlet 206 preferably is a slit, as shown in the lower insert of FIG. 2. Annular opening 204 has, for example, a diameter of about 1.5 inches and a width along the radial direction from about ⅛ in to about 1/16 in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably cylindrical lenses with a focal length equal to the distance between the center of the chamber to the surface of the lens to focus the light beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants and/or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 190 or to a separate inert gas source. In either case, flow to inlets 216, 218 preferably is controlled by a mass flow controller 220.

Light source 108 is aligned to generate a light beam 222 that enters window 212 and exits window 214. Windows 212, 214 define a light path through main chamber 200 intersecting the flow of reactants at reaction zone 224. After exiting window 214, light beam 222 strikes power meter 226, which also acts as a beam dump. An appropriate power meter is available from Coherent Inc., Santa Clara, Calif. Light source 108 can be a laser or an intense conventional light source such as an arc lamp. Preferably, light source 108 is an infrared laser, especially a CW $CO_2$ laser such as an 1800 watt maximum power output laser available from PRC Corp., Landing, N.J.

Reactants passing through reactant inlet 206 in injection nozzle 202 initiate a reactant stream. The reactant stream passes through reaction zone 224, where reaction involving the metal precursor compounds takes place. Heating of the gases in reaction zone 224 is extremely rapid, roughly on the order of $10^5$ degree C/sec depending on the specific conditions. The reaction is rapidly quenched upon leaving reaction zone 224, and particles 228 are formed in the reactant stream. The nonequilibrium nature of the process allows for the production of nanoparticles with a highly uniform size distribution and structural homogeneity.

The path of the reactant stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232, as shown in the upper insert of FIG. 2. Circular opening 232 feeds into collection system 106.

The chamber pressure is monitored with a pressure gauge attached to the main chamber. The preferred chamber pressure for the production of the desired oxides generally ranges from about 80 Torr to about 500 Torr.

Reaction chamber 104 has two additional tubular sections not shown. One of the additional tubular sections projects into the plane of the sectional view in FIG. 2, and the second additional tubular section projects out of the plane of the sectional view in FIG. 2. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of particles.

Collection system 106 preferably includes a curved channel 270 leading from collection nozzle 230. Because of the small size of the particles, the product particles follow the flow of the gas around curves. Collection system 106 includes a filter 272 within the gas flow to collect the product particles. Due to curved section 270, the filter is not supported directly above the chamber. A variety of materials such as Teflon, glass fibers and the like can be used for the filter as long as the material is inert and has a fine enough mesh to trap the particles. Preferred materials for the filter include, for example, a glass fiber filter from ACE Glass Inc., Vineland, N.J. and cylindrical polypropylene filters from Cole-Parmer Instrument Co., Vernon Hills, Ill.

Pump 274 is used to maintain collection system 106 at a selected pressure. A variety of different pumps can be used. Appropriate pumps for use as pump 274 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, PA with a pumping capacity of about 195 cfm. It may be desirable to flow the exhaust of the pump through a scrubber 276 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the light source and monitors the pressure in the reaction chamber. The computer can be used to control the flow of reactants and/or the shielding gas. The pumping rate is controlled by either a manual needle valve or an automatic throttle valve inserted between pump 274 and filter 272. As the chamber pressure increases due to the accumulation of particles on filter 272, the manual valve or the throttle valve can be adjusted to maintain the pumping rate and the corresponding chamber pressure.

The reaction can be continued until sufficient particles are collected on filter 272 such that pump 274 can no longer maintain the desired pressure in the reaction chamber 104 against the resistance through filter 272. When the pressure in reaction chamber 104 can no longer be maintained at the desired value, the reaction is stopped, and filter 272 is removed. With this embodiment, about 1–300 grams of particles can be collected in a single run before the chamber pressure can no longer be maintained. A single run generally can last up to about 10 hours depending on the type of particle being produced and the type of filter being used.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the top of the reaction chamber, and the product particles are collected from the bottom of the chamber. In the alternative configuration, the collection system may not include a curved section so that the collection filter is mounted directly below the reaction chamber.

2. Second Laser Pyrolysis Reaction Chamber

An alternative design of a laser pyrolysis apparatus has been described in copending and commonly assigned U.S. patent application Ser. No. 08/808,850, entitled "Efficient Production of Particles by Chemical Reaction," incorporated herein by reference. This alternative design is intended to facilitate production of commercial quantities of particles by laser pyrolysis. The reaction chamber is elongated along the light beam in a dimension perpendicular to the reactant stream to provide for an increase in the throughput of reactants and products. The original design of the apparatus was based on the introduction of purely gaseous reactants. A particular embodiment for the introduction of an aerosol into the apparatus is described below. Additional embodiments for the introduction of an aerosol with one or more aerosol generators into an elongated reaction chamber is described in commonly assigned and copending U.S. patent application Ser. No. 09/188,670 to Gardner et al., entitled "Reactant Delivery Apparatuses," filed Nov. 9, 1998, incorporated herein by reference.

In general, the alternative pyrolysis apparatus includes a reaction chamber designed to reduce contamination of the chamber walls, to increase the production capacity and to make efficient use of resources. To accomplish these objectives, an elongated reaction chamber is used that provides for an increased throughput of reactants and products without a corresponding increase in the dead volume of the chamber. The dead volume of the chamber can become contaminated with unreacted compounds and/or reaction products.

Figure 5:
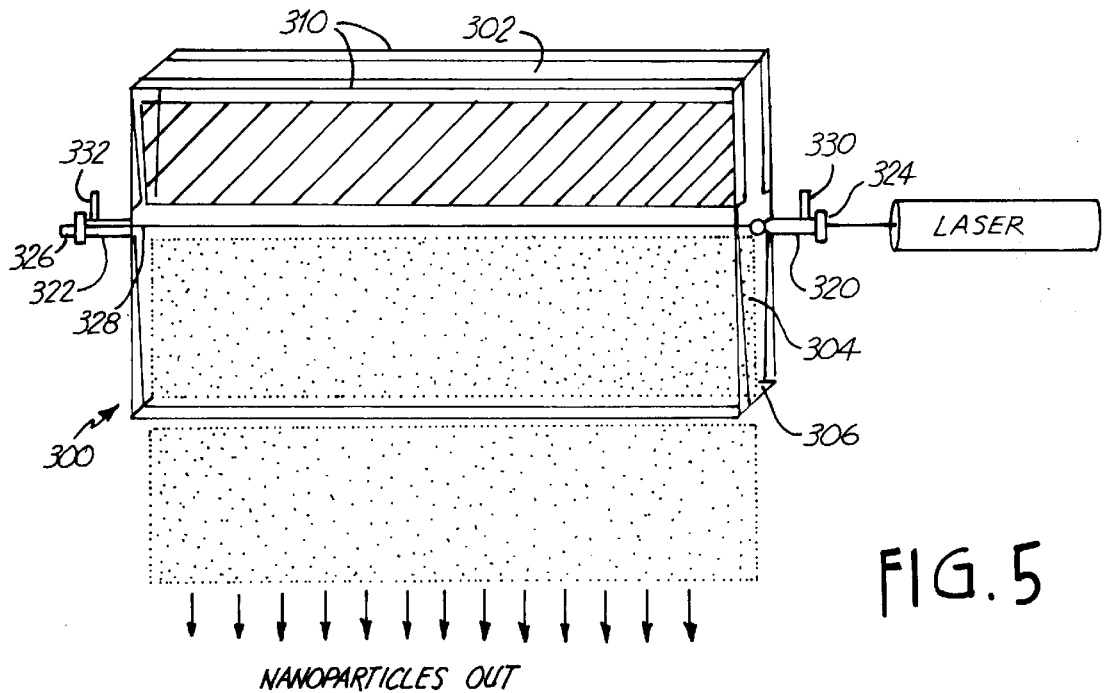
FIG. 5 is a schematic, perspective view of an elongated reaction chamber for the performance of laser pyrolysis, where components of the reaction chamber are shown as transparent to reveal internal structure.

The design of the improved reaction chamber 300 is shown schematically in FIG. 5. A reactant inlet 302 leads to main chamber 304. Reactant inlet 302 conforms generally to the shape of main chamber 304. Main chamber 304 includes an outlet 306 along the reactant/product stream for removal of particulate products, any unreacted gases and inert gases. Shielding gas inlets 310 are located on both sides of reactant inlet 302. Shielding gas inlets are used to form a blanket of inert gases on the sides of the reactant stream to inhibit contact between the chamber walls and the reactants or products.

Tubular sections 320, 322 extend from the main chamber 304. Tubular sections 320, 322 hold windows 324, 326 to define a light beam path 328 through the reaction chamber 300. Tubular sections 320, 322 can include inert gas inlets 330, 332 for the introduction of inert gas into tubular sections 320, 322.

Figure 6:
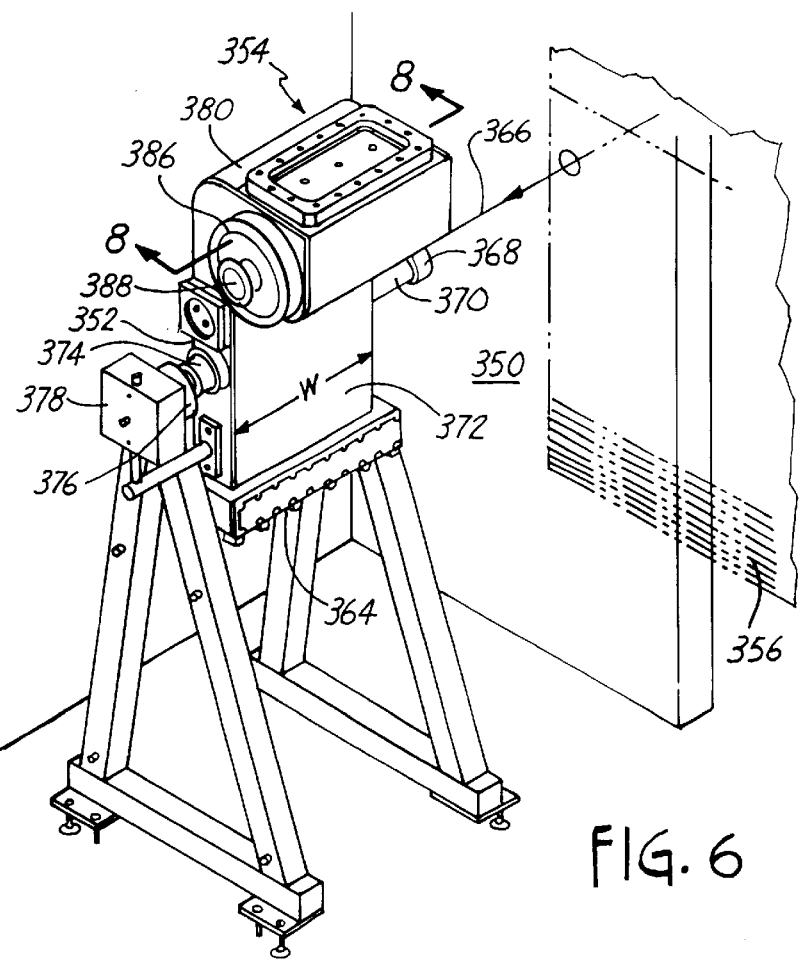
FIG. 6 is a perspective view of an embodiment of an elongated reaction chamber for performing laser pyrolysis.
Figure 7:
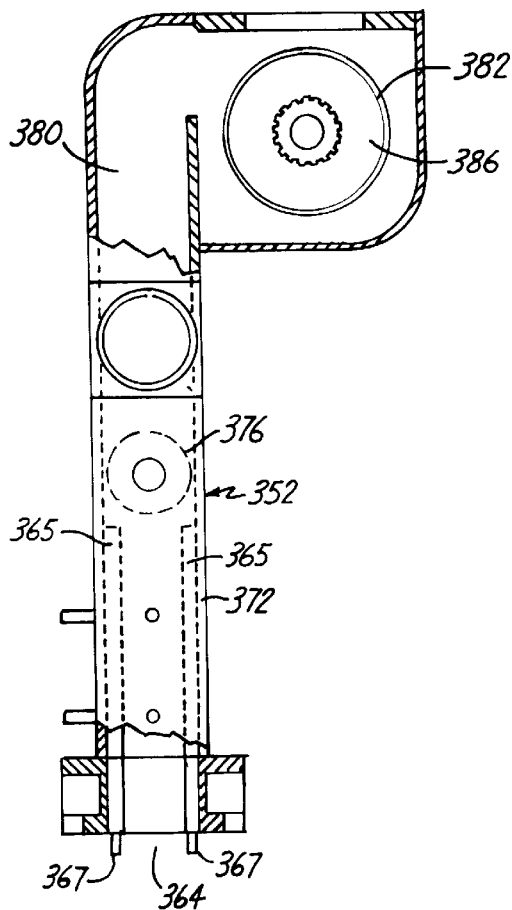
FIG. 7 is a cut away, side view of the reaction chamber of FIG. 6.
Figure 8:
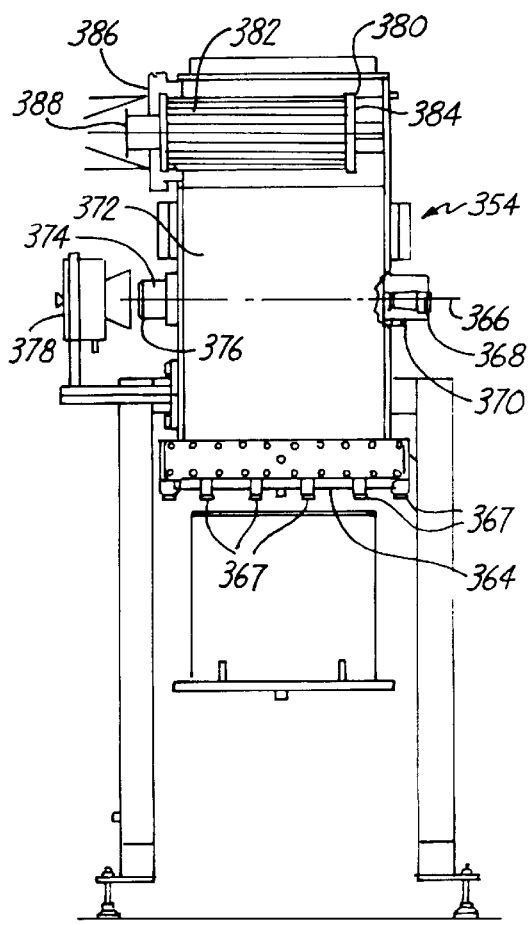
FIG. 8 is a partially sectional, front view of the reaction chamber of FIG. 6, taken along line 8—8 of FIG. 6.

Referring to FIGS. 6–8, a specific embodiment 350 of a laser pyrolysis reaction system with an elongated reaction chamber is shown. In this embodiment, an aerosol reactant delivery apparatus is adapted for use with the elongated reaction chamber. Laser pyrolysis reaction system 350 includes reaction chamber 352, a particle collection system 354, laser 356 and a reactant delivery system (described below). Reaction chamber 352 includes reactant inlet 364 at the bottom of reaction chamber 352 where the reactant delivery system connects with reaction chamber 352. In this embodiment, the reactants are delivered from the bottom of the reaction chamber while the products are collected from the top of the reaction chamber. The configuration can be reversed with the reactants supplied from the top and product collected from the bottom, if desired.

Shielding gas conduits 365 are located on the front and back of reactant inlet 364. Inert gas is delivered to shielding gas conduits 365 through ports 367. The shielding gas conduits direct shielding gas along the walls of reaction chamber 352 to inhibit association of reactant gases or products with the walls.

Reaction chamber 352 is elongated along one dimension denoted in FIG. 6 by "w". A laser beam path 366 enters the reaction chamber through a window 368 displaced along a tube 370 from main chamber 372 and traverses the elongated direction of reaction chamber 352. The laser beam passes through tube 374 and exits window 376. In one preferred embodiment, tubes 370 and 374 displace windows 368 and 376 about 11 inches from main chamber 372. The laser beam terminates at beam dump 378. In operation, the laser beam intersects a reactant stream generated through reactant inlet 364.

The top of main chamber 372 opens into particle collection system 354. Particle collection system 354 includes outlet duct 380 connected to the top of main chamber 372 to receive the flow from main chamber 372. Outlet duct 380 carries the product particles out of the plane of the reactant stream to a cylindrical filter 382. Filter 382 has a cap 384 on one end. The other end of filter 382 is fastened to disc 386. Vent 388 is secured to the center of disc 386 to provide access to the center of filter 382. Vent 388 is attached by way of ducts to a pump. Thus, product particles are trapped on filter 382 by the flow from the reaction chamber 352 to the pump. Suitable pumps were described above with respect to the first laser pyrolysis apparatus in FIG. 2. Suitable filters for use as filter 382 include, for example, an air cleaner filter for a Saab 9000 automobile (Purilator part A44-67), which is wax impregnated paper with Plasticol or polyurethane end cap 384.

Figure 9:
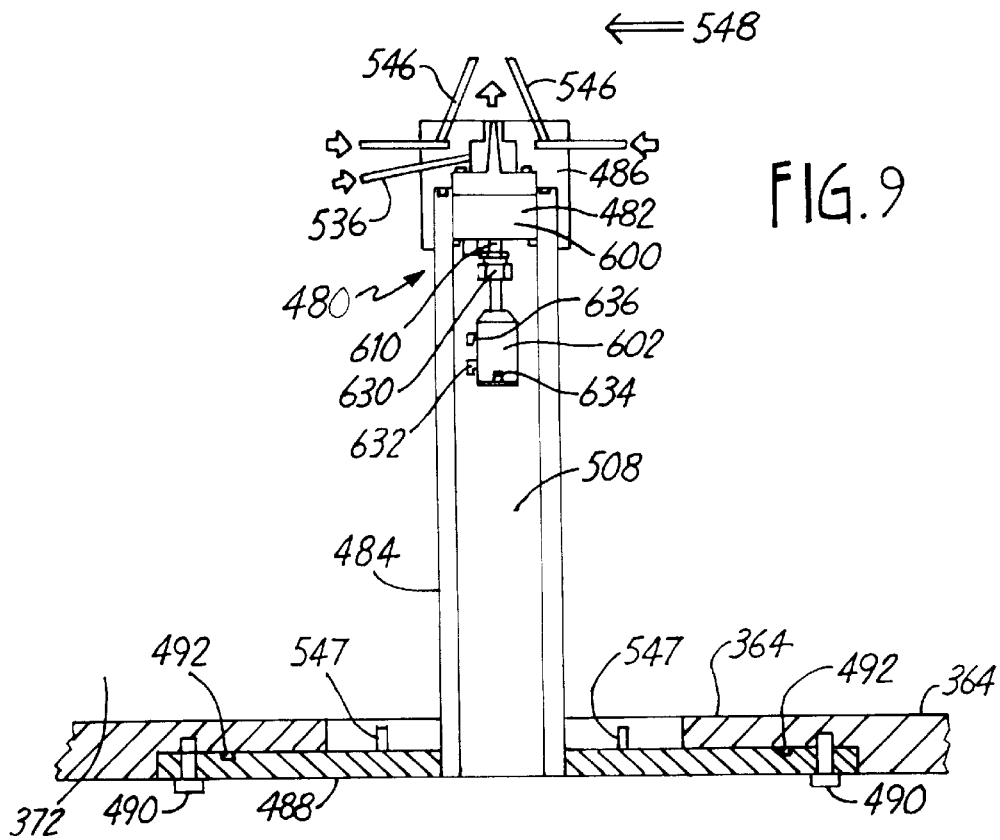
FIG. 9 is a sectional, front view of a reactant delivery apparatus for the delivery of an aerosol reactant into the reaction chamber of FIG. 6, where the cross section is taken through the center of the reactant delivery apparatus.
Figure 10:
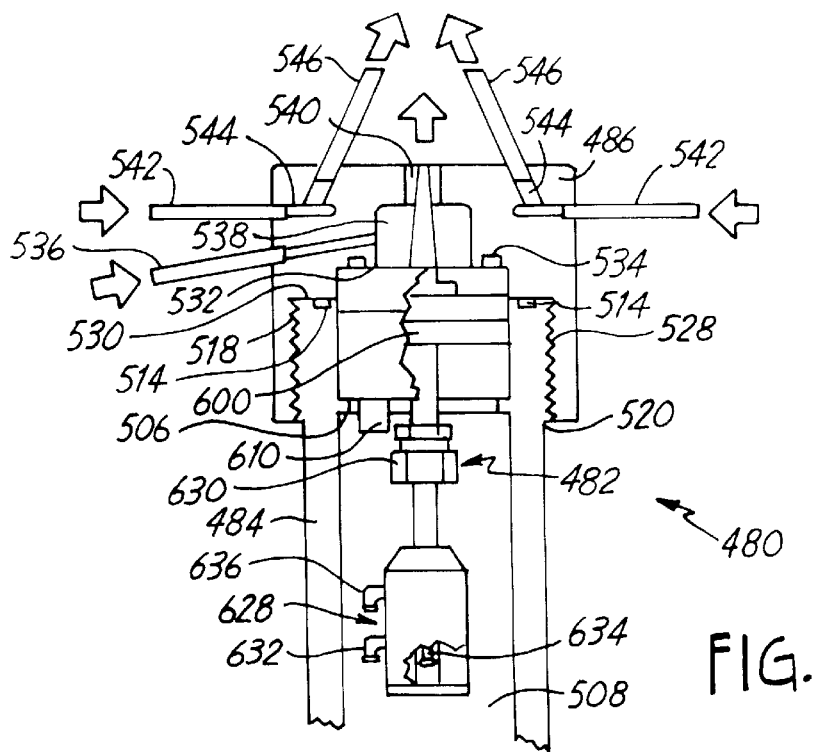
FIG. 10 is a fragmentary, sectional front view of the top portion of the reactant delivery apparatus of FIG. 9.
Figure 21:
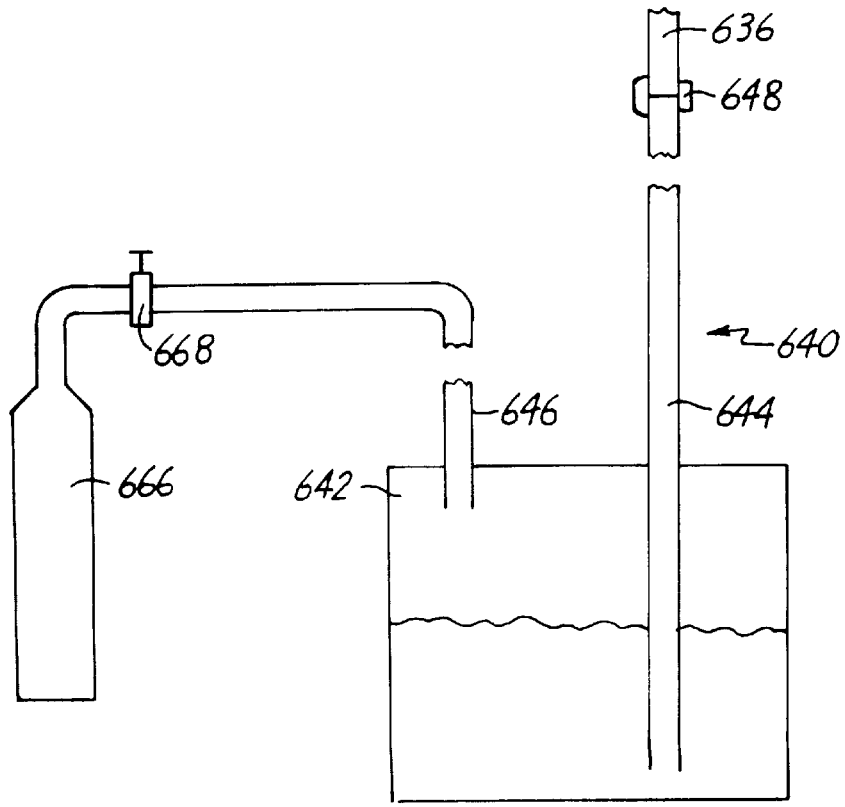
FIG. 21 is a schematic, side view of a liquid supply system for supplying liquid to the aerosol generator of FIGS. 19 and 20.

Referring to FIG. 9, an aerosol delivery apparatus 480 includes an aerosol generator 482, which is supported by mount 484 and a cap 486. Aerosol delivery apparatus 480 is secured to reactant inlet 364 of reaction chamber 352 to extend within main chamber 372, shown in FIGS. 6–8. Mount 484 is connected to a base plate 488. Base plate 488 is fastened to reactant inlet 364 with bolts 490. An o-ring or the like, suitably shaped, can be placed within hollow 492 to form a seal between base plate 488 and reactant inlet 364.

Referring to FIGS. 10 and 11, mount 484 has a generally cylindrical shape. Mount 484 includes a lip 506 extending within cylindrical cavity 508. Lip 506 helps support aerosol generator 482. In this embodiment, lip 506 includes a notch 510, which allows a portion of aerosol generator 482 to extend past lip 506. Top surface 512 of mount 484 includes a hollow 514 for holding an o-ring or the like to form a seal with cap 486 or a spacer, described below. Mount 484 further includes threads 518 on the outer surface 520.

Referring to FIGS. 10, 12 and 13, cap 486 attaches over the top of mount 484. Cap 486 includes threads 528 that are mated with threads 518 on mount 484. Flange 530 can be used to form a seal with an o-ring or the like. Surface 532 includes hollow 534. Hollow 534 can hold an o-ring or the like to form a seal with aerosol generator 482 or a shim, described further below.

Tube 536 is in fluid communication with cavity 538. Tube 536 provides for gas flow into cavity 538. Cavity 538 vents through port 540. Tubes 542 provide for fluid flow through channels 544 into projecting tubes 546. In this embodiment, four projecting tubes 546 project toward the flow stream coming from aerosol generator 482 and port 540. Four projecting tubes 546 are symmetrically distributed around port 540. More or less than four projecting tubes 546 can be used, if desired. Gas can be supplied to tubes 536 and 542 through one or more ports 547 through base plate 488 (FIG. 9) by way of stainless steel tubing or the like.

The use of projecting tubes 546 are particularly useful to mix reactants further within the reaction chamber away from aerosol generator 482. Using projecting tubes 546, gases such as reactant gases and/or radiation absorbing gases can be mixed within reaction chamber 352 with reactants from aerosol generator 482 and/or port 540. Laser beam path 548 intersects the reaction stream just above projecting tubes 546.

The position of aerosol generator 482 relative to port 540 can affect the properties of the resulting reactant stream and thereby the properties of the reaction product. With an ultrasonic aerosol generator, the tip of the aerosol generator preferably is located between positions just slightly below the cap surface to just slightly above the cap surface.

Spacer 550, shown in FIG. 14, can be placed between cap 486 and mount 484 to change the position of aerosol generator 482 relative to port 540. Spacer 550 is a cylindrical piece with a hollow 552 along top surface 554 for holding an o-ring or the like. Top surface 554 seals against flange 530 of cap 486. Lower surface 556 of spacer 550 seals against top surface 512 of mount 484. A shim 558, as shown in FIG. 15, is correspondingly placed between cap 486 and aerosol generator 482. Top surface 560 of shim 558 engages the o-ring in hollow 534. Flange 562 engages the aerosol generator 482.

The flow of reactants into main chamber 372 can be affected by the placement of a cap bushing at the opening of port 540. More specifically, a cap bushing can help provide a more confined reactant stream within main chamber 372. Three embodiments of cap bushings 570, 572, 574 are shown in FIGS. 16–18, respectively. Referring to FIG. 16, cap bushing 570 has a cylindrical passage 576 and a flat upper surface 578 generally perpendicular to the central axis of cylindrical passage 576. Referring to FIG. 17, cap bushing 572 has a conical passage 580 and a flat upper surface 582 generally perpendicular to the symmetry axis of conical passage 580. Referring to FIG. 18, cap bushing 574 has a conical passage 584 and a top surface with a flat section 586 and a conical section 588. Preferred embodiments of cap bushings have a sharp edge between the internal passage and the top surface.

Reaction chamber 352 and reactant supply system 480 preferably are constructed from stainless steel or other corrosion resistant metal. O-rings and other seals can be made from natural or synthetic rubber or other polymers.

Referring to FIG. 10, in a preferred embodiment, aerosol generator 482 includes an ultrasonic nozzle 600 and nozzle supply 602. Preferred ultrasonic nozzle 600 is a model 8700-120 from Sono-Tek Corporation, Milton, N.Y. Referring to FIGS. 19–20, ultrasonic nozzle 600 includes a nozzle tip 604, a nozzle body 606, a connector 608 for connection to an ultrasonic generator, and a liquid connection 610 for connection to a liquid reservoir directly or by way of nozzle supply 602. The end of nozzle tip 604 is an atomization surface 612. The size and shape of atomization surface 612 can be varied to yield a desirable spacial distribution of aerosol particles.

Nozzle tip 604 is connected to nozzle body 606 at or near top surface 614. Ultrasonic transducer 616 is located within nozzle body 606 at a suitable position to vibrate nozzle tip 604. Generally, ultrasonic transducer 616 is located toward top surface 614. Preferred ultrasonic transducers include, for example, piezoelectric transducers. Preferably, ultrasonic transducer 616 includes two or more piezoelectric transducers 618 coupled to oscillate in phase such that the amplitudes of the two vibrating piezoelectric transducers add to create an additive force at atomizing surface 612.

Ultrasonic transducer 616 is connected to an ultrasonic generator by way of connector 608. The ultrasonic generator preferably is a broad band generator operating over a frequency range from about 20 kHz to about 120 kHz. The electrical signal from the ultrasonic generator is conveyed from connector 608 to ultrasonic transducer 616 by way of conductors 620.

Liquid flows from liquid connection 610 to atomization surface 612 through channel 622, which runs through nozzle body 606. Referring to FIG. 10, nozzle supply 602 is connected to liquid connection 610 with a liquid fitting 630. Nozzle supply 602 includes a needle valve with pneumatic control. Nozzle supply 602 has a pneumatic control inlet 632, a needle valve adjustment 634 and a liquid feedstock inlet 636. Pneumatic control inlet 632 and liquid feedstock inlet 636 are accessed through central channel 508, which extends through base plate 488.

Liquid feedstock inlet 636 is connected to a liquid supply apparatus 640, shown schematically in FIG. 21. Liquid supply apparatus 640 includes, at least, one liquid source 642, an outlet tube 644 and a gas supply tube 646. Tube 644 connects with fitting 648 to liquid feedstock inlet 636. Similarly, tube 644 is connected directly or indirectly to liquid source 642. Liquid source 642 also connects to gas supply tube 646. Gas supply tube connects to a gas source 666, which can be a gas cylinder or the like. Flow from gas source 666 to gas supply tube 646 is controlled by one or more valves 668. Gas under pressure from gas supply tube 646 forces liquid from liquid source 642 into tube 644.

Proper placement of liquid source 642 can result in gravity supplying the pressure as an alternative to using gas pressure. In other embodiments, mechanical pumps are used to supply a relatively constant amount of pressure within tube 644. Suitable pumps include, for example, centrifical pumps and a plurality of syringe pumps that operate sequentially.

In use, the aerosol generator 482 produces an aerosol of a liquid supplied to aerosol generator 482. Aerosol generator 482 can deliver a gas along with the aerosol. Also, the aerosol can be combined with a gas supplied through tube 536. Thus, the aerosol and any gases supplied from aerosol generator 482 and/or tube 536 are directed into reaction chamber 352 near port 540 of cap 486. The aerosol and any gases emanating from aerosol generator 482 and/or tube 536 can be combined further within reaction chamber 352 with additional gases from projecting tubes 546. The resulting mixture of aerosol and gases is subsequently reacted within reaction chamber 352.

For the performance of laser pyrolysis based reaction synthesis, the aerosol/gas mixture generally includes one or more reactants in aerosol form, optionally, one or more additional reactant gases, a laser absorbing gas if the reactants and/or solvent(s) do not sufficiently absorb the laser radiation, and, optionally, an inert gas. The gases can be supplied from a pressurized cylinder or other suitable container. Multiple reactants can be mixed in the liquid phase and delivered as the aerosol.

B. Heat Processing

It has been discovered that heat processing can be used to form nanoscale lithium manganese oxides. In a preferred approach to the thermal formation of lithium manganese oxide, manganese oxide nanoscale particles first are mixed with a lithium compound. The resulting mixture is heated in an oven to form a lithium manganese oxide. The heating resulting in lithium incorporation into the manganese oxide lattice can be performed in an oxidizing environment or an inert environment. In either type of environment, the heating step generally results in alteration of the oxygen-to-manganese ratio, lithium-to-manganese ratio, lithium-to-oxygen ratio or a combination thereof.

The use of sufficiently mild conditions, i.e., temperatures well below the melting point of the manganese oxide particles, results in lithium incorporation into the manganese oxide particles without significantly sintering the particles into larger particles. The manganese oxide particles used for the lithiation process preferably are nanoscale manganese oxide particles. It has been discovered that spinel lithium manganese oxides can be formed from manganese oxides with an oxidation state less than +4. In particular, manganese oxides with an oxidation states from +2 (MnO) to +4 ($MnO_2$) can be used to form lithium manganese oxide spinels. Suitable manganese oxide nanoparticles can have a stoichiometry of, for example, MnO, $Mn_3O_4$, $Mn_2O_3$, $Mn_5O_8$, $MnO_2$, and corresponding mixed phase materials.

Suitable lithium compounds include for example, lithium nitrate ($LiNO_3$), lithium chloride (LiCl), $Li_2CO_3$, LiOH, $LiOH.H_2O$, $Li_2C_2O_4$, $LiHC_2O_4$, $LiHC_2O_4.H_2O$, $Li_3C_6H_5O_7.4H_2O$, $LiCOOH.H_2O$, and $LiC_2H_3O_2.H_2O$. Lithium incorporation into manganese oxide nanoparticles with some of these lithium compounds may require oxygen in the atmosphere during the heat processing. Appropriate oxidizing gases include, for example, $O_2$, $O_3$, CO, $CO_2$ and combinations thereof. The reactant gas can be diluted with inert gases such as Ar, He and $N_2$. For example, air and/or clean, dry air can be used as a source of oxygen and inert gas. Alternatively, the gas atmosphere can be exclusively inert gas. Lithium manganese oxides have been produced with either an inert atmosphere or an oxidizing atmosphere, as described in the Examples below.

In addition, the heat processing can result in an alteration of the crystal lattice and/or removal of adsorbed compounds on the particles to improve the quality of the particles. The processing generally of metal oxide nanoscale particles in an oven is discussed further in copending and commonly assigned, U.S. patent application Ser. No. 08/897,903, filed Jul. 21, 1997, entitled "Processing of Vanadium Oxide Particles With Heat," incorporated herein by reference. In particular, heat processing under mild conditions can be used to alter the crystal structure of lithium manganese oxide nanoparticles formed by laser pyrolysis. Specifically, amorphous lithium manganese oxide can be annealed to crystalline, cubic spinel, lithium manganese oxide without sintering the particles into larger particles.

Figure 22:
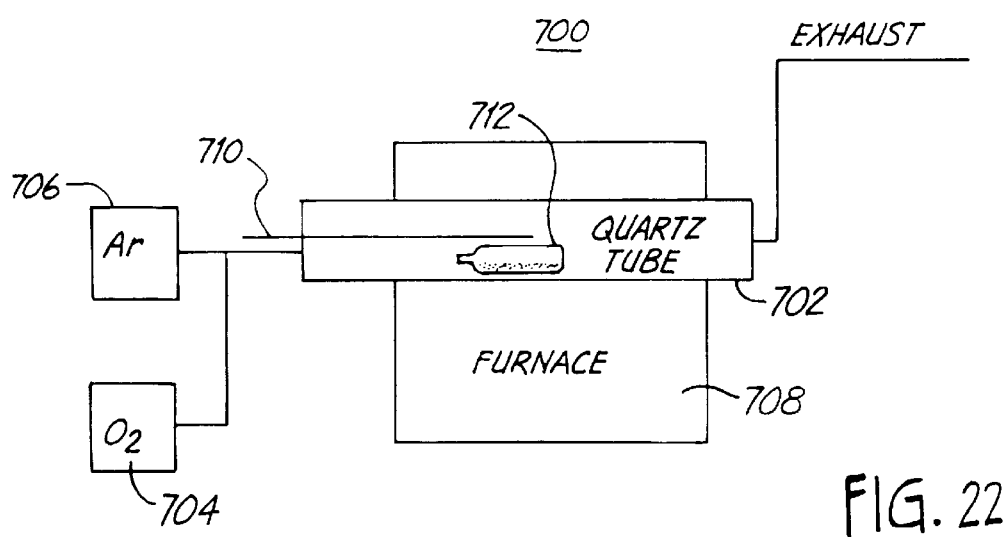
FIG. 22 is a schematic, sectional view of an oven for heating nanoparticles, in which the section is taken through the center of the quartz tube.

A variety of apparatuses can be used to perform the heat processing for lithium incorporation and/or annealing of a sample. An embodiment of an apparatus 700 to perform this processing is displayed in FIG. 22. Apparatus 700 includes a tube 702 into which the particles are placed. Tube 702 is connected to a reactant gas source 704 and inert gas source 706. Reactant gas, inert gas or a combination thereof are placed within tube 702 to produce the desired atmosphere.

Preferably, the desired gases are flowed through tube 702. Tube 702 is located within oven or furnace 708. Oven 708 maintains the relevant portions of the tube at a relatively constant temperature, although the temperature can be varied systematically through the processing step, if desired. Temperature in oven 708 generally is measured with a thermocouple 710. Vial 712 prevents loss of the particles due to gas flow. Vial 712 generally is oriented with the open end directed toward the direction of the source of the gas flow. To form lithium manganese oxide in the heating step, a mixture of manganese oxide particles and particles of lithium compound can be placed in tube 702 within a vial 712. In alternatively embodiments, lithium manganese oxide particles produced by laser pyrolysis are placed into vial 712 for heating in tube 702.

The precise conditions including type of oxidizing gas (if any), concentration of oxidizing gas, pressure or flow rate of gas, temperature and processing time can be selected to produce the desired type of product material. The temperatures generally are mild, i.e., significantly below the melting point of the material. The use of mild conditions avoids interparticle sintering resulting in larger particle sizes. Some controlled sintering of the particles can be performed in oven 708 at somewhat higher temperatures to produce slightly larger, average particle diameters.

For lithium incorporation into manganese oxide, the temperature preferably ranges from about 60° C. to about 600° C. and more preferably from about 100° C. to about 550° C. The particles preferably are heated for about 5 minutes to about 300 hours. For the heat processing (annealing) of lithium manganese oxide produced by laser pyrolysis, the temperature preferably ranges from about 50° C. to about 600° C. and more preferably from about 50° C. to about 550° C. The lithium manganese particles preferably are heated for about 5 minutes to about 100 hours. Some empirical adjustment may be required to produce the conditions appropriate for yielding a desired material.

C. Particle Properties

A collection of particles of interest, comprising either manganese oxides or lithium manganese oxides, generally has an average diameter for the primary particles of less than about 500 nm, preferably from about 5 nm to about 100 nm, more preferably from about 5 nm to about 50 nm. The primary particles usually have a roughly spherical gross appearance. Upon closer examination, crystalline particles generally have facets corresponding to the underlying crystal lattice. Nevertheless, crystalline primary particles tend to exhibit growth that is roughly equal in the three physical dimensions to give a gross spherical appearance. In preferred embodiments, 95 percent of the primary particles, and preferably 99 percent, have ratios of the dimension along the major axis to the dimension along the minor axis less than about 2. Diameter measurements on particles with asymmetries are based on an average of length measurements along the principle axes of the particle.

Because of their small size, the primary particles tend to form loose agglomerates due to van der Waals and other electromagnetic forces between nearby particles. Nevertheless, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, vanadium oxide nanoparticles generally exhibit surprisingly high energy densities in lithium batteries, as described in copending and commonly assigned U.S. patent application Ser. No. 08/897,776, U.S. Pat. No. 5,952,125, entitled "Batteries With Electroactive Nanoparticles," incorporated herein by reference.

The primary particles preferably have a high degree of uniformity in size. Laser pyrolysis, as described above, generally results in particles having a very narrow range of particle diameters. Furthermore, heat processing under mild conditions does not alter the very narrow range of particle diameters. With aerosol delivery, the distribution of particle diameters is particularly sensitive to the reaction conditions. Nevertheless, if the reaction conditions are properly controlled, a very narrow distribution of particle diameters can be obtained with an aerosol delivery system, as described above. As determined from examination of transmission electron micrographs, the primary particles generally have a distribution in sizes such that at least about 95 percent, and preferably 99 percent, of the primary particles have a diameter greater than about 40 percent of the average diameter and less than about 160 percent of the average diameter. Preferably, the primary particles have a distribution of diameters such that at least about 95 percent, and preferably 99 percent, of the primary particles have a diameter greater than about 60 percent of the average diameter and less than about 140 percent of the average diameter.

Furthermore, in preferred embodiments no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be exploited in a variety of applications.

In addition, the nanoparticles generally have a very high purity level. The crystalline manganese oxide and lithium manganese oxide nanoparticles produced by the above described methods are expected to have a purity greater than the reactants because the crystal formation process tends to exclude contaminants from the lattice. Furthermore, crystalline manganese oxide particles produced by laser pyrolysis have a high degree of crystallinity. Similarly, the crystalline lithium manganese oxide nanoparticles produced by heat processing have a high degree of crystallinity. Impurities on the surface of the particles may be removed by heating the particles to achieve not only high crystalline purity but high purity overall.

Manganese oxides are known to exist in a wide range of oxidation states from +2 to +4. The most common stoichiometries for manganese oxides include $MnO$, $Mn_3O_4$, $Mn_2O_3$, $Mn_5O_8$, and $MnO_2$. $MnO$ and $Mn_5O_8$ have only a single known crystalline phase. In particular, $MnO$ has a cubic crystal structure while $Mn_5O_8$ has a monoclinic crystal structure. Several of the manganese oxides can exist in alternative crystal structures. For example, $Mn_3O_4$ has either a tetragonal or orthorhombic crystal structure. $Mn_2O_3$ has either a cubic or a hexagonal crystal structure. Also, $MnO_2$ has either a cubic, orthorhombic or tetragonal crystal structure.

Lithium manganese oxides have a complex phase diagram that reflects some of the complexity of the manganese oxide phase diagram. High lithium content spinel phases of lithium manganese oxide can have a stoichiometry over the range from $Li_{1+x}Mn_{2-x}O_4$, where $-0 \leq x \leq 0.33$. In addition, oxygen rich (deficient, y negative) defect spinel phases exist with stoichiometries of $LiMn_2O_{4+y}$, where $-0.4 \leq y \leq 0.5$. Furthermore, the lithium manganese oxide can be lithium deficient corresponding to stoichiometries of $Li_{1-z}Mn_2O_4$, $0 \leq z \leq 0.2$. Overall, the spinels and defect spinels cover stoichiometries of $Li_{1+x-z}Mn_{2-x}O_{4+y}$, where $0 \leq x \leq 0.33$, $-0.4 \leq y \leq 0.5$ and $0 \leq z \leq 0.2$. Other states of lithium manganese oxides are known, such as $Li_2MnO_3$, $Li_{0.33}MnO_2$, $Li_4Mn_5O_{12}$, tetragonal $Li_xMn_2O_4$, $1.8 \leq x \leq 2.2$, $LiMnO_2$, $Li_2MnO_2$, and $\lambda\text{-}MnO_2$. $\lambda\text{-}MnO_2$ is formed by chemically extracting lithium from $LiMn_2O_4$ with acid, e.g., 1M $H_2SO_4$ or $HNO_3$. $\lambda\text{-}MnO_2$ has a structure of $Li_xMn_2O_4$, $0.05 \leq x \leq 0.20$, depending on the extraction conditions.

D. Battery Application of Lithium Manganese Oxides

Figure 23:
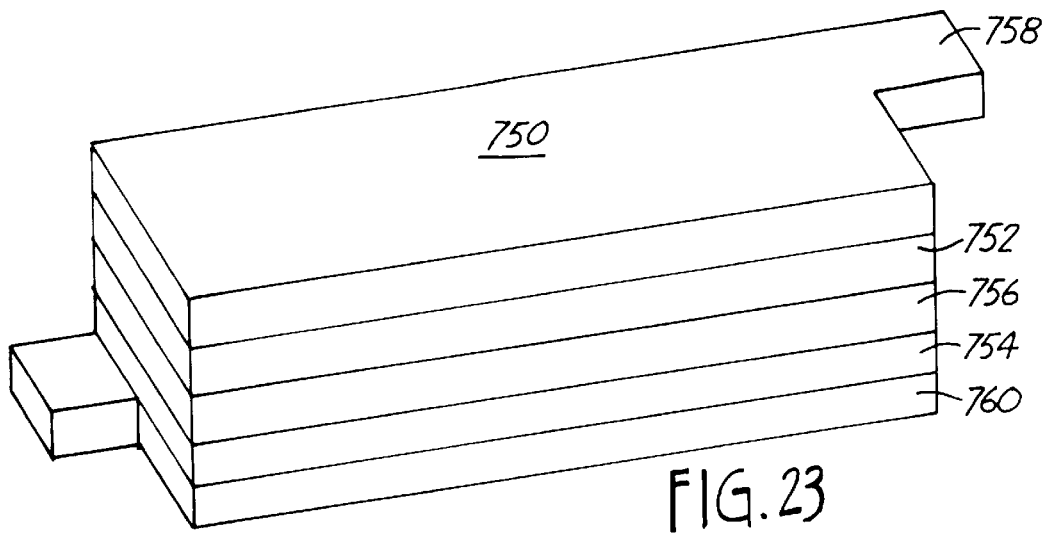
FIG. 23 is a schematic, perspective view of a battery of the invention.

Referring to FIG. 23, battery 750 has an negative electrode 752, a positive electrode 754 and separator 756 between negative electrode 752 and positive electrode 754. A single battery can include multiple positive electrodes and/or negative electrodes. Electrolyte can be supplied in a variety of ways as described further below. Battery 750 preferably includes current collectors 758, 760 associated with negative electrode 752 and positive electrode 754, respectively. Multiple current collectors can be associated with each electrode if desired.

Lithium has been used in reduction/oxidation reactions in batteries because it is the lightest metal and because it is the most electropositive metal. Certain forms of lithium manganese oxide are known to incorporate additional lithium ions into its structure through intercalation or similar mechanisms such as topochemical absorption. Intercalation of lithium ions into suitable forms of a lithiated lithium manganese oxide lattice forms $Li_aMnO_b$.

In lithium manganese oxide spinels, a portion of the lithium is at tetrahedral spinel lattice sites. Changes in lithium incorporation into the lattice can involve variations in the amount of lithium at the tetrahedral sites from about 0.1 to about 1.0 per two manganese atoms. At low enough lithium concentration, the spinel crystal structure collapses. Alternatively, additional lithium can enter octahedral intercalation sites within the spinel lattice once the tetrahedral sites are essentially full.

Lithium intercalates into the lithium manganese oxide lattice during discharge of the battery. Upon discharge, the positive electrode acts as a cathode and the negative electrode acts as an anode. The lithium leaves the lattice upon recharging, i.e., when a voltage is applied to the cell such that electric current flows into the positive electrode due to the application of an external EMF to the battery. Appropriate lithium manganese oxides can be an effective electroactive material for a positive electrode in either a lithium or lithium ion battery.

There are several forms of lithium manganese oxide spinels suitable for use as a positive electrode active material within a lithium based battery. The stoichiometric spinel, $LiMn_2O_4$, is a normal spinel consisting of an oxygen close-packed lattice with lithium occupying one-eighth of the tetrahedral positions and manganese occupying one-half of the octahedral positions. If lithium is removed from this material within an electrochemical cell, the voltage of the cell is generally above 3.5V and typically above 3.8V, and can extend to about 4.4V or higher. Such a voltage profile is referred to as a 4 volt profile and the capacity derived from the cell is referred to as a 4 volt capacity. A material possessing an appreciable amount of 4 volt capacity is referred to as a 4 volt material. If lithium is inserted into octahedral sites of $LiMn_2O_4$ within an electrochemical cell, the voltage of the cell is generally below 3.5V, and extends downward to about 2.0V or lower. Such a profile is referred to as a 3 volt profile and the capacity derived from the cell is referred to as a 3 volt capacity. A material possessing an appreciable amount of 3 volt capacity is referred to as a 3 volt material.

If there is excess lithium, a lithium substituted spinel, $Li_{1+y}Mn_{2-y}O_4$, is formed where the excess lithium occupy the manganese sites. For values of y less than about 0.33, lithium can still be extracted, and a cell containing this material would exhibit a 4 volt profile. As y is increased, the amount of extractable lithium decreases with a concomitant decrease in the 4 volt capacity. For values around 0.33 with a stoichiometry of $Li_{1.33}Mn_{1.67}O_4$ or $Li_4Mn_5O_{12}$, the material becomes a 3 volt material since only a minor amount of 4 volt capacity remains.

If there are cationic vacancies in the spinel, a defect spinel is formed with the general formula $Li_{1-z}Mn_{2-z}O_4$. A common form is a defect spinel with z=0.11 yielding $Li_{0.89}Mn_{1.78}O_4$ or $Li_2Mn_4O_9$. This material is primarily a 3 volt material. Additionally, this material is a lower-temperature material that usually is synthesized in an oxygen-rich environment. Upon heating to a high temperature in an inert environment, $Li_2Mn_4O_9$ converts into $LiMn_2O_4$.

Positive electrode 754 includes electroactive nanoparticles such as lithium manganese oxide nanoparticles held together with a binder such as a polymeric binder. Nanoparticles for use in positive electrode 754 generally can have any shape, e.g., roughly spherical nanoparticles or elongated nanoparticles. In addition to lithium manganese oxide, positive electrode 754 can include other electroactive nanoparticles such as $TiO_2$ nanoparticles, vanadium oxide nanoparticles, and/or manganese oxide nanoparticles. The production ot $TiO_2$ nanoparticles has been described, see U.S. Patent Ser. No. 4,705,762, incorporated herein by reference. The use of vanadium oxide nanoparticles in lithium based batteries is described in copending and commonly assigned U.S. patent application Ser. No. 08/897,776, U.S. Pat. No. 5,952,125, entitled "Batteries With Electroactive Nanoparticles," incorporated herein by reference.

While some electroactive materials are reasonable electrical conductors, a positive electrode generally includes electrically conductive particles in addition to the electroactive nanoparticles. These supplementary, electrically conductive particles generally are also held by the binder. Suitable electrically conductive particles include conductive carbon particles such as carbon black, metal particles such as silver particles, stainless steel fibers and the like.

High loadings of particles can be achieved in the binder. Particles preferably make up greater than about 80 percent by weight of the positive electrode, and more preferably greater than about 90 percent by weight. The binder can be any of various suitable polymers such as polyvinylidene fluoride, polyethylene oxide, polyethylene, polypropylene, polytetrafluoro ethylene, polyacrylates, ethylene-(propylene-diene monomer) copolymer (EPDM) and mixtures and copolymers thereof.

Negative electrode 752 can be constructed from a variety of materials that are suitable for use with lithium ion electrolytes. In the case of lithium batteries, the negative electrode can include lithium metal or lithium alloy metal either in the form of a foil, grid or metal particles in a binder.

Lithium ion batteries use particles of an composition that can intercalate lithium. The particles are held with a binder in the negative electrode. Suitable intercalation compounds include, for example, graphite, synthetic graphite, coke, mesocarbons, doped carbons, fullerenes, niobium pentoxide, tin alloys, $SnO_2$, and mixtures and composites thereof.

Current collectors 758, 760 facilitate flow of electricity from battery 750. Current collectors 758, 760 are electrically conductive and generally made of metal such as nickel, iron, stainless steel, aluminum and copper and can be metal foil or preferably a metal grid. Current collector 758, 760 can be on the surface of their associated electrode or embedded within their associated electrode.

The separator element 756 is electrically insulating and provides for passage of at least some types of ions. Ionic transmission through the separator provides for electrical neutrality in the different sections of the cell. The separator generally prevents electroactive compounds in the positive electrode from contacting electroactive compounds in the negative electrode.

A variety of materials can be used for the separator. For example, the separator can be formed from glass fibers that form a porous matrix. Preferred separators are formed from polymers such as those suitable for use as binders. Polymer separators can be porous to provide for ionic conduction. Alternatively, polymer separators can be solid electrolytes formed from polymers such as polyethylene oxide. Solid electrolytes incorporate electrolyte into the polymer matrix to provide for ionic conduction without the need for liquid solvent.

Electrolytes for lithium batteries or lithium ion batteries can include any of a variety of lithium salts. Preferred lithium salts have inert anions and are nontoxic. Suitable lithium salts include, for example, lithium hexafluorophosphate, lithium hexafluoroarsenate, lithiumbis (trifluoromethylsulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride and lithium perfluorobutane.

If a liquid solvent is used to dissolve the electrolyte, the solvent preferably is inert and does not dissolve the electroactive materials. Generally appropriate solvents include, for example, propylene carbonate, dimethyl carbonate, diethyl carbonate, 2-methyl tetrahydrofuran, dioxolane, tetrahydrofuran, 1,2-dimethoxyethane, ethylene carbonate, γ-butyrolactone, dimethyl sulfoxide, acetonitrile, formamide, dimethylformamide and nitromethane.

The shape of the battery components can be adjusted to be suitable for the desired final product, for example, a coin battery, a rectangular construction or a cylindrical battery. The battery generally includes a casing with appropriate portions in electrical contact with current collectors and/or electrodes of the battery. If a liquid electrolyte is used, the casing should prevent the leakage of the electrolyte. The casing can help to maintain the battery elements in close proximity to each other to reduce resistance within the battery. A plurality of battery cells can be placed in a single case with the cells connected either in series or in parallel.

PARTICLE SYNTHESIS EXAMPLES

Example 1
Manganese Oxide Particle Synthesis, Gas Phase Reactants

The synthesis of manganese oxide particles described in this example was performed by laser pyrolysis. The particles were produced using essentially the laser pyrolysis apparatus of FIG. 2, described above, using the reactant delivery apparatus of FIG. 3 along with the solid precursor delivery system shown schematically in FIG. 1.

The manganese carbonyl (Strem Chemical, Inc., Newburyport, Mass.) precursor vapor was carried into the reaction chamber by flowing Ar gas through the solid precursor delivery system containing the $Mn_2(CO)_{10}$. The precursor was heated to a temperature as indicated in Table 1. $C_2H_4$ gas was used as a laser absorbing gas, and Argon was used as an inert gas. The reaction gas mixture containing $Mn_2(CO)_{10}$, Ar, $O_2$ and $C_2H_4$ was introduced into the reactant gas nozzle for injection into the reaction chamber. The reactant gas nozzle had an opening with dimensions of ⅝ in.×1/16 in. Additional parameters of the laser pyrolysis synthesis relating to the particles of Example 1 are specified in Table 1.

TABLE 1

|  | 1 | 2 | 3 |
|---|---|---|---|
| Crystalline Phase | Manganosite | Manganosite | Manganosite & unidentified |
| Crystal Structure | Cubic | Cubic | Cubic |
| Pressure (Torr) | 180 | 320 | 430 |
| Argon F.R.-Window (SCCM) | 700 | 700 | 700 |
| Argon F.R.-Shielding (SLM) | 1.71 | 1.99 | 1.99 |
| Ethylene (SCCM) | 492 | 517 | 517 |
| Carrier Gas (Argon) SCCM | 507 | 507 | 627 |
| Oxygen (SCCM) | 348 | 400 | 420 |
| Laser Output | 260 | 108 | 206 |

TABLE 1-continued

|  | 1 | 2 | 3 |
|---|---|---|---|
| (Watts) |  |  |  |
| Precursor Temperature ° C. | 140 | 140 | 150 | sccm = standard cubic centimeters per minute
slm = standard liters per minute
Argon - Win. = argon flow through inlets 216, 218
Argon - Sld. = argon flow through annular channel 142.

Figure 24:
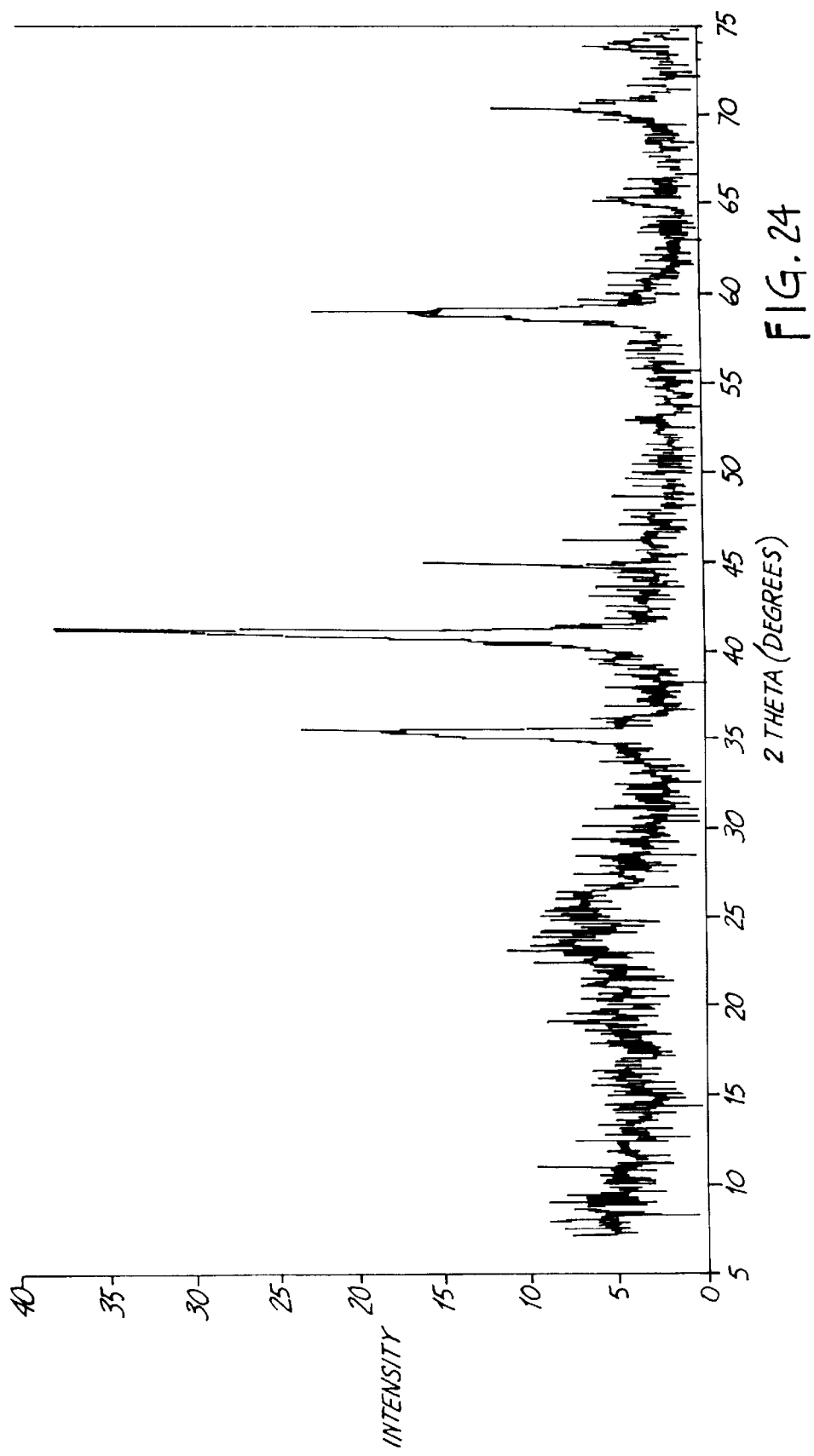
FIG. 24 is an x-ray diffractogram of manganese oxide nanoparticles produced by laser pyrolysis with gaseous reactants according to the parameters specified in column 1 of Table 1.
Figure 25:
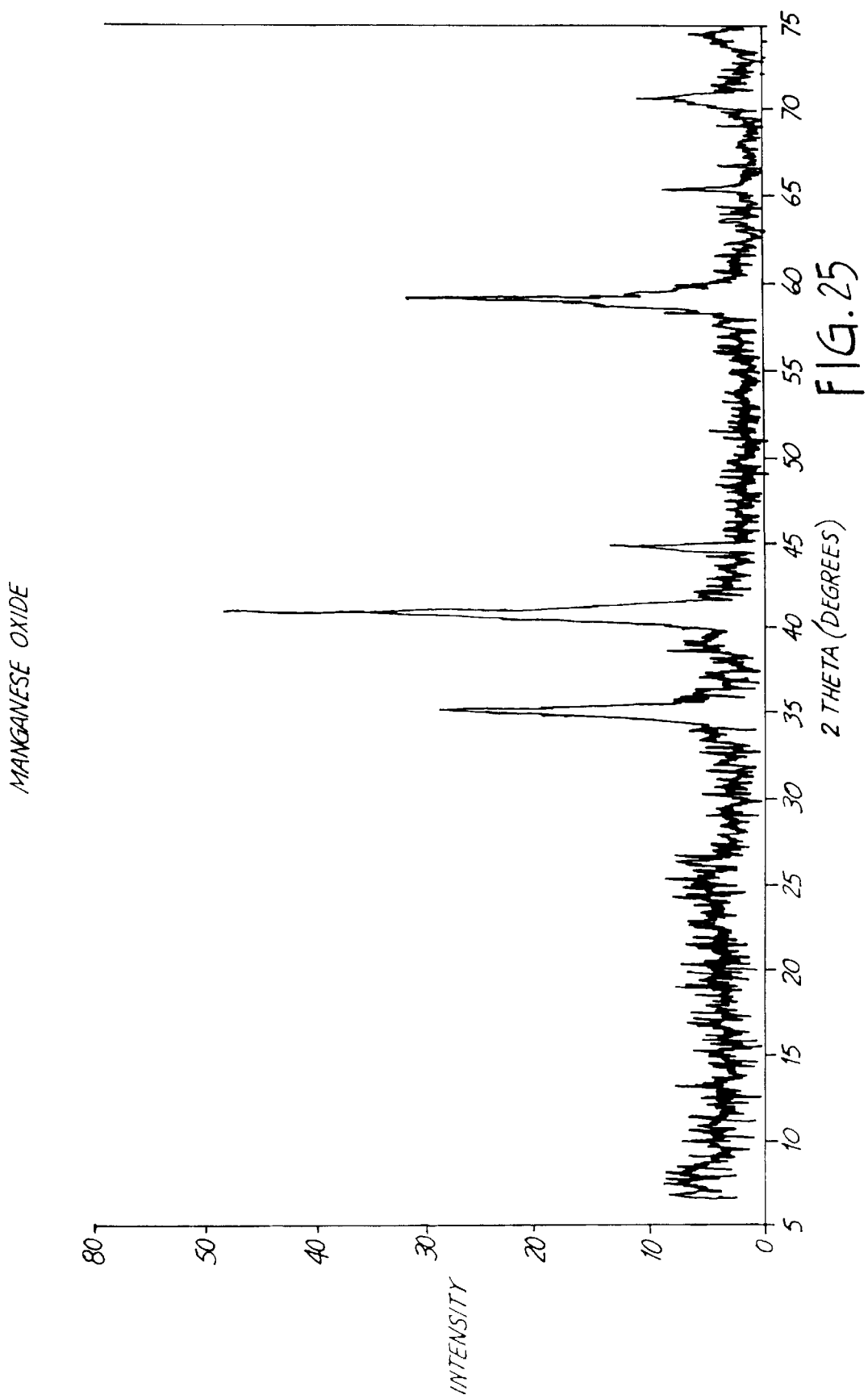
FIG. 25 is an x-ray diffractogram of manganese oxide nanoparticles produced by laser pyrolysis with gaseous reactants according to the parameters specified in column 2 of Table 1.
Figure 26:
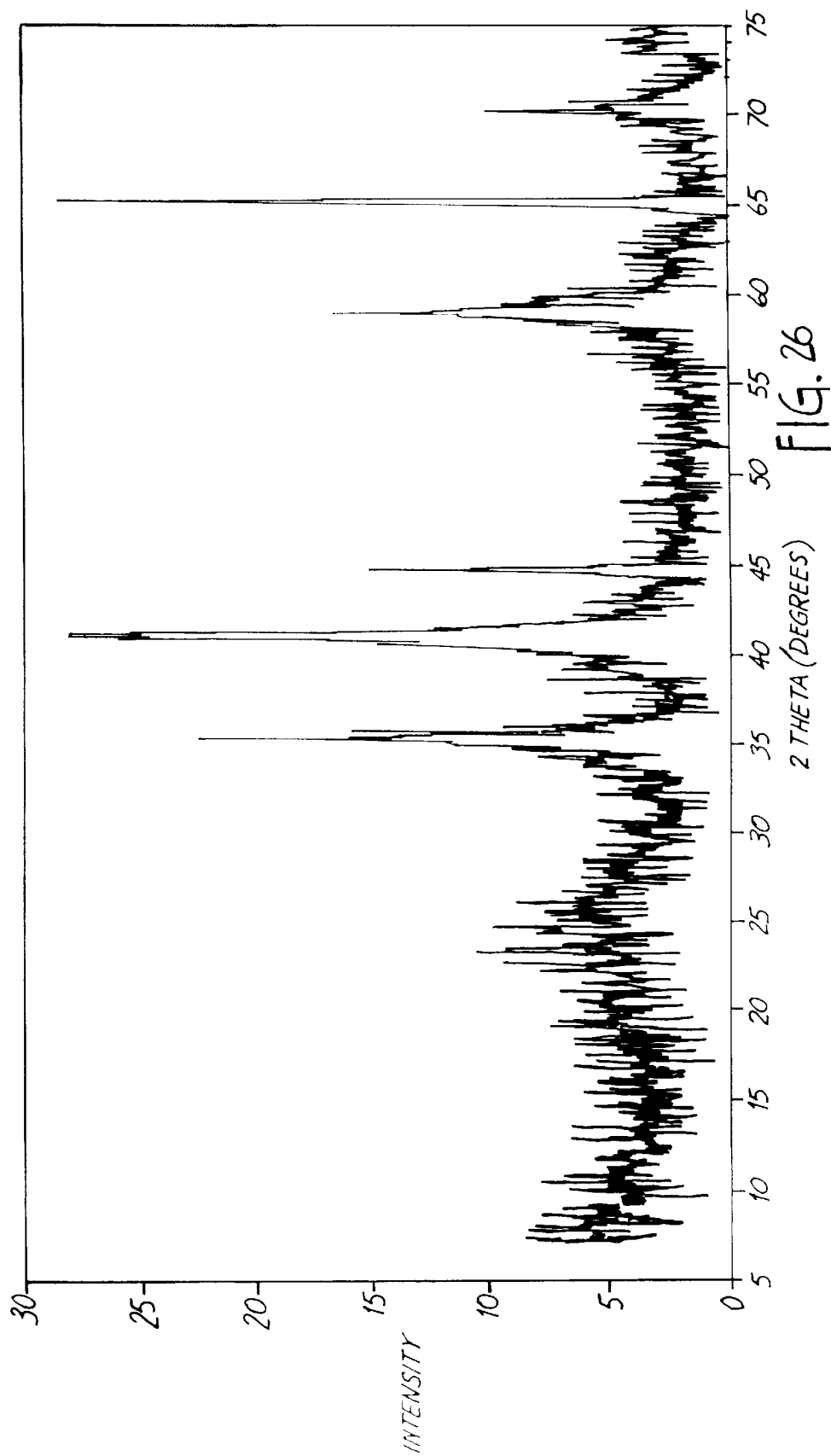
FIG. 26 is an x-ray diffractogram of manganese oxide nanoparticles produced by laser pyrolysis with gaseous reactants according to the parameters specified in column 3 of Table 1.

The production rate of manganese oxide particles was typically about 1 g/hr. To evaluate the atomic arrangement, the samples were examined by x-ray diffraction using the Cu(Kα) radiation line on a Siemens D500 x-ray diffractometer. X-ray diffractograms for a sample produced under the conditions specified in the three columns of Table 1 is shown in FIGS. 24–26, respectively. Under the set of conditions specified in Table 1, the particles had an x-ray diffractogram corresponding to manganosite (cubic) MnO. The particles produced under the conditions in the third column of Table 1 also had a peak at 65° produced by the aluminum samples holder. The sample holder is occasionally seen in the diffractogram. The diffractograms may also have peaks indicating the presence of small amounts of amorphous carbon, which can form as a coating on the particles. The amorphous carbon can be removed by gentle heating in an oxygen environment. Such coating of amorphous carbon are described further in copending and commonly assigned U.S. patent application Ser. No. 09/136,483 to Kumar et al., entitled "Aluminum Oxide Particles," incorporated herein by reference.

Figure 27:
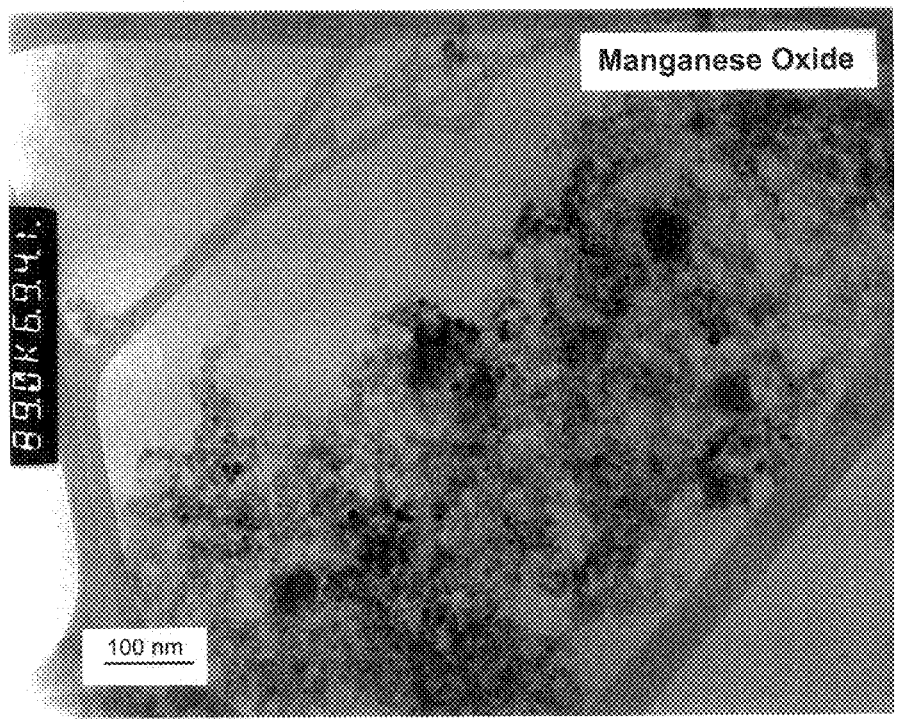
FIG. 27 is a transmission electron micrograph of manganese oxide nanoparticles produced by laser pyrolysis with gaseous reactants according to the parameters specified in column 2 of Table 1.
Figure 28:
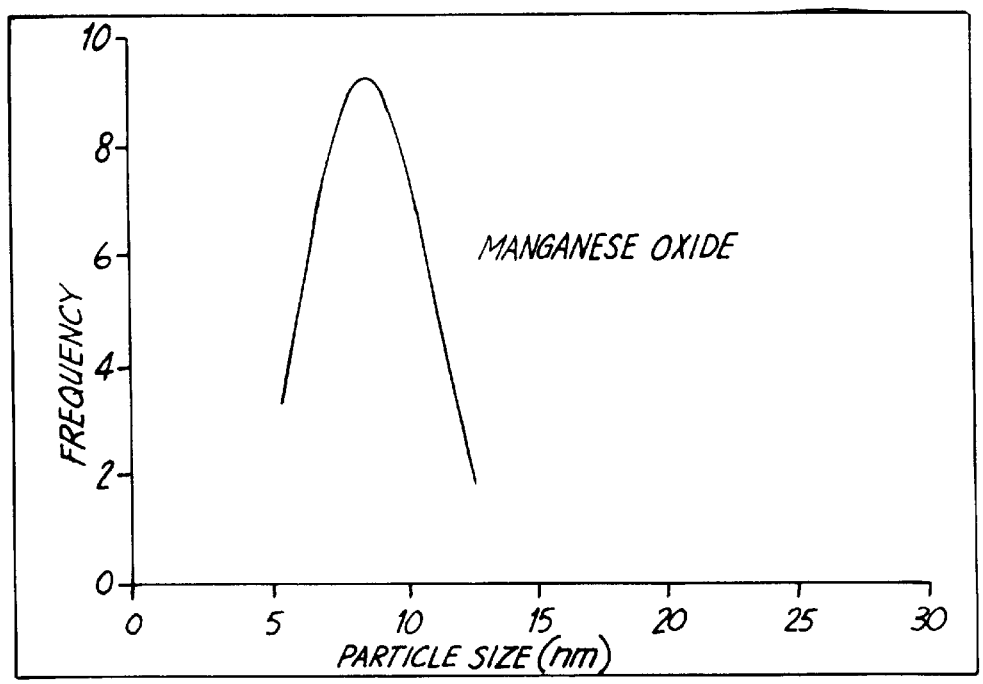
FIG. 28 is a plot of particle diameter distribution for the particles shown in the transmission electron micrograph shown in FIG. 27.

Transmission electron microscopy (TEM) was used to determine particle sizes and morphology. A TEM photograph of the particles produced under the conditions in the second column of Table 1 are shown in FIG. 27. An examination of a portion of the TEM micrograph yielded an average particle size of about 9 nm. The corresponding particle size distribution is shown in FIG. 28. The approximate size distribution was determined by manually measuring diameters of the particles distinctly visible in the micrograph of FIG. 27. Only those particles having clear particle boundaries were measured to avoid regions distorted or out of focus in the micrograph. Measurements so obtained should be more accurate and are not biased since a single view cannot show a clear view of all particles. It is significant that the particles span a rather narrow range of sizes.

Example 2
Manganese Oxide Particle Synthesis—Aerosol Metal Precursors, First Laser Pyrolysis Apparatus The synthesis of manganese oxide particles described in this example was performed by laser pyrolysis. The particles were produced using essentially the laser pyrolysis apparatus of FIG. 2, described above, using the reactant delivery apparatus of FIG. 4.

The manganese chloride (Alfa Aesar, Inc., Ward Hill, Mass.) precursor vapor was carried into the reaction chamber as an aerosol of an aqueous solution formed with deionized water. $C_2H_4$ gas was used as a laser absorbing gas, and Argon was used as an inert gas. The reactant mixture containing $MnCl_2$, Ar, $O_2$ and $C_2H_4$ was introduced into the reactant nozzle for injection into the reaction chamber. The reactant nozzle had an opening with dimensions of ⅝ in.×1/16 in. Additional parameters of the laser pyrolysis synthesis relating to the particles of Example 2 are specified in Table 2.

TABLE 2

| | 1 |
|---|---|
| Crystalline Phase | Amorphous + Manganosite (MnO) |
| Crystal Structure | Amorphous + Cubic |
| Pressure (Torr) | 350 |
| Argon F.R.-Window (SCCM) | 700 |
| Argon F.R.-Shielding (SLM) | 6.8 |
| Ethylene (SLM) | 1.27 |
| Carrier Gas (Argon) SLM | 6.35 |
| Oxygen (SCCM) | 883 |
| Laser Output (Watts) | 660 |
| Precursor | Manganese Chloride solution in water |
| Precursor Molarity | 2 M |
| Precursor Temperature ° C. | Room Temperature | sccm = standard cubic centimeters per minute
slm = standard liters per minute
Argon - Win. = argon flow through inlets 216, 218
Argon - Sld. = argon flow through annular channel 142.

Figure 29:
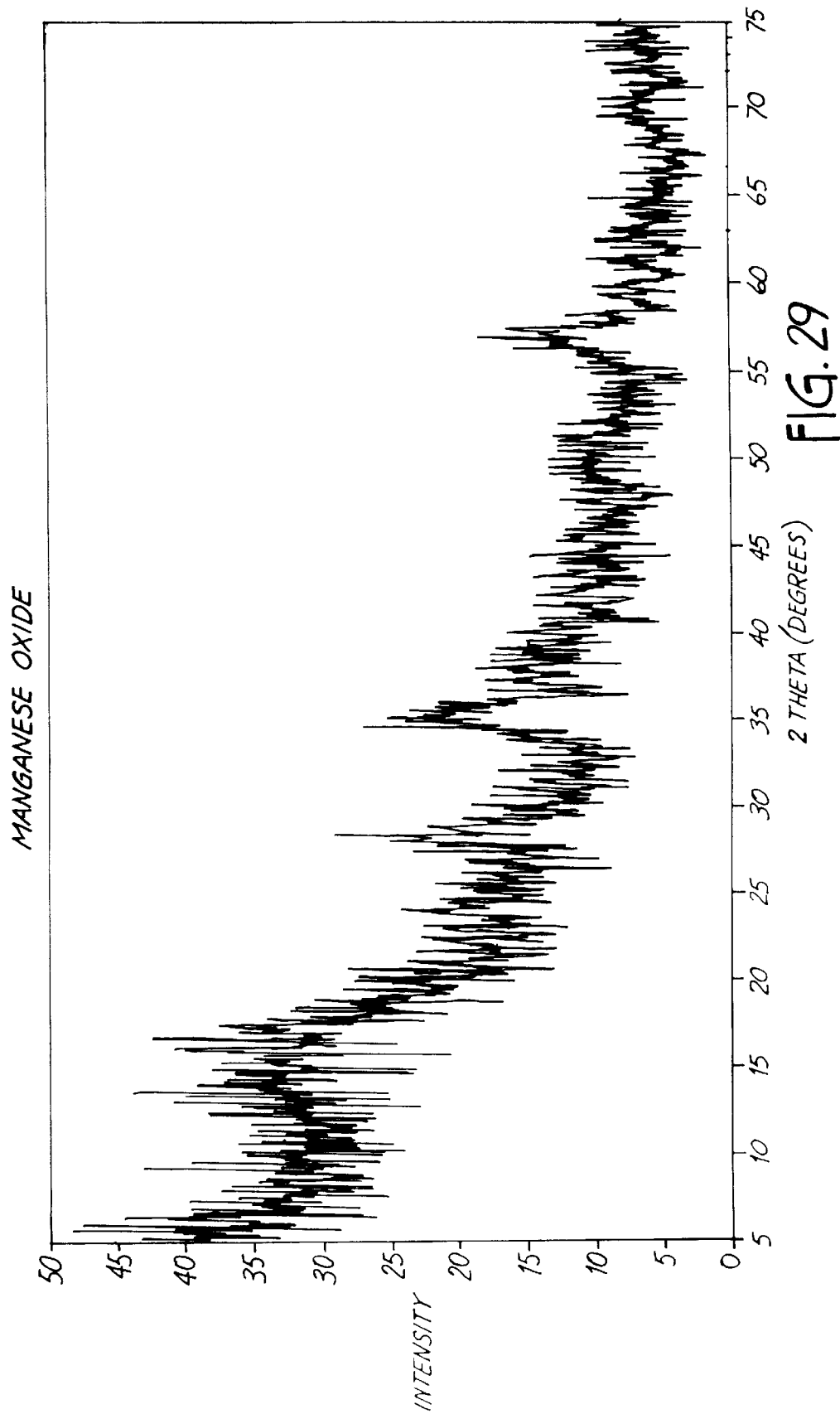
FIG. 29 is an x-ray diffractogram of manganese oxide nanoparticles produced by laser pyrolysis with an aerosol manganese precursor according to the parameters specified in Table 2.

The production rate of manganese oxide particles was typically about 1 g/hr. To evaluate the atomic arrangement, the samples were examined by x-ray diffraction using the Cu(Kα) radiation line on a Siemens D500 x-ray diffractometer. X-ray diffractograms for a sample produced under the conditions specified in Table 2 is shown in FIG. 29. The particles again had an x-ray diffractogram corresponding to manganosite (cubic) MnO, although the peaks in the x-ray diffractogram were very weak indicating that the particles were substantially amorphous. Based on these results, variations in the reaction conditions should result in either amorphous MnO or more highly crystalline MnO.

Figure 31:
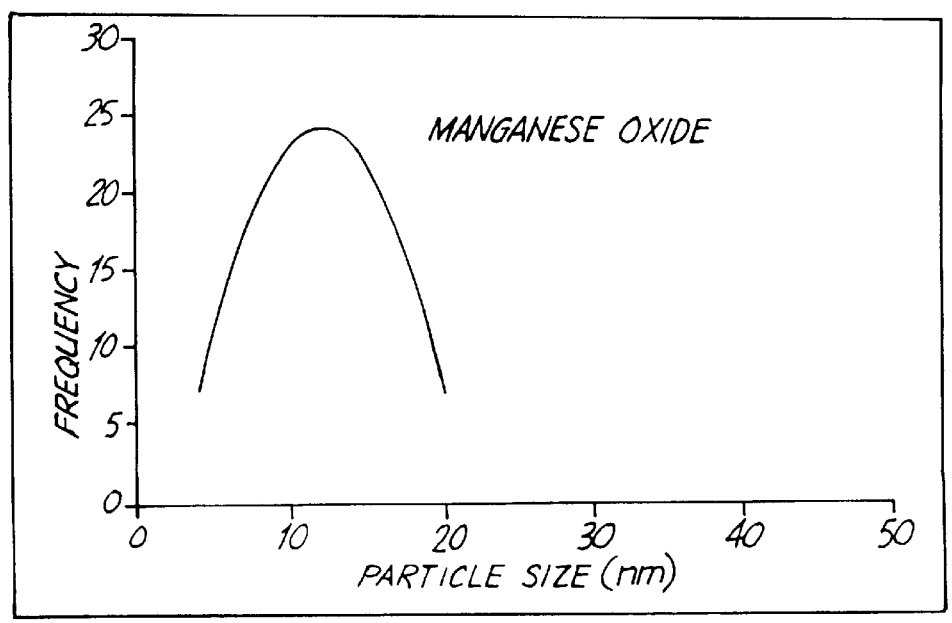
FIG. 31 is a plot of particle size distribution for the particles shown in the transmission electron micrograph shown in FIG. 30.
Figure 30:
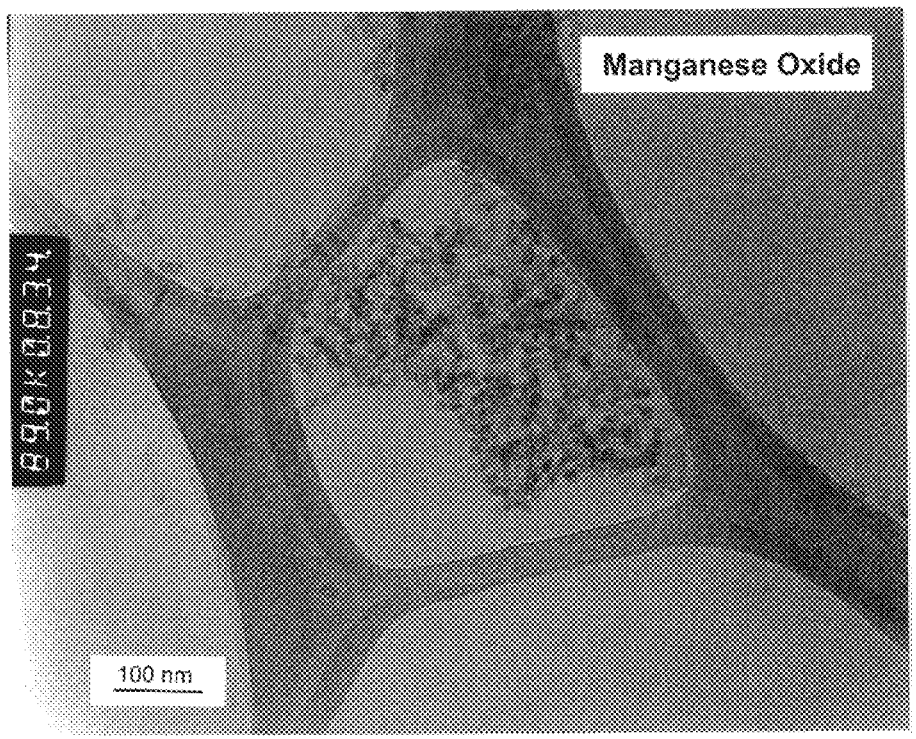
FIG. 30 is a transmission electron micrograph of manganese oxide nanoparticles produced by laser pyrolysis with an aerosol manganese precursor according to the parameters specified in Table 2.

Transmission electron microscopy (TEM) was used to determine particle sizes and morphology. A TEM micrograph for the particles produced under the conditions of Table 2 is displayed in FIG. 30. The corresponding particle size distribution is shown in FIG. 31. The particle size distribution was obtained following the procedure described in Example 1.

Figure 19:
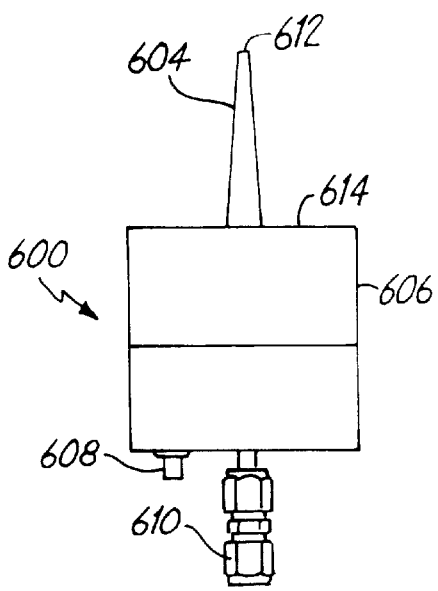
FIG. 19 is a side view of an ultrasonic aerosol generator having an atomization surface.
Figure 20:
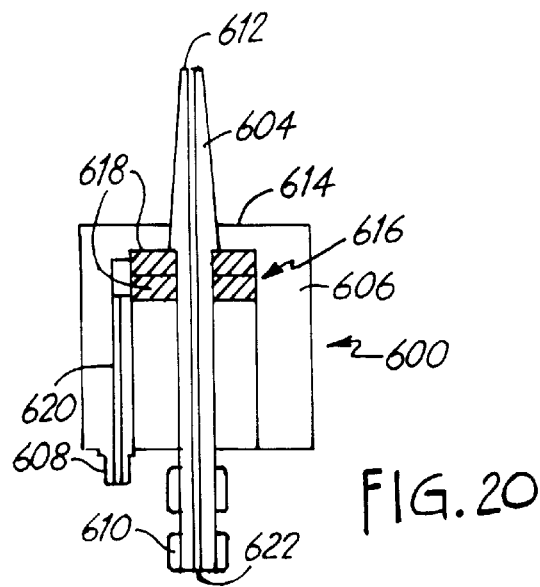
FIG. 20 is a sectional, side view of the ultrasonic aerosol generator of FIG. 19, where the cross section is taken through the center of the apparatus.

Example 3
Manganese Oxide Particle Synthesis—Aerosol Metal Precursors, Second Laser Pyrolysis Apparatus The synthesis of manganese oxide particles described in this example was performed by laser pyrolysis. The particles were produced using a laser pyrolysis apparatus essentially as shown in FIGS. 6–13, described above and the ultrasonic nozzle essentially as shown in FIGS. 19–20. No cap bushing was used. A spacer 550 and shim 558 was used to raise the level of the ultrasonic nozzle to approximately the top of the cap. The solution delivered by the aerosol delivery apparatus contained 2 molar $MnNO_3 \cdot H_2O$ (Strem Chemical, Inc., Newburyport, Mass.) in solvent formed from 495 ml of 99% isopropyl alcohol and 5 ml of 38% aqueous HCl. Isopropyl alcohol acts as a infrared absorber. Oxygen was mixed with the aerosol by delivery through tube 536. Projecting tubes 546 in FIG. 10 were not present. The top of cap 486 was about 0.85 inches from the center line of the laser beam. Additional parameters for two runs are presented in Table 3.

TABLE 3

| | 1 | 2 |
|---|---|---|
| Crystalline Phase | MnO + $Mn_3O_4$ | MnO + $Mn_3O_4$ |
| Pressure (Torr) | 300 | 200 |

TABLE 3-continued

| | 1 | 2 |
|---|---|---|
| Argon Window (SLM) | 25 | 7.5 |
| Argon Shielding (SLM) | 40 | 70 |
| Oxygen (SLM) | 5 | 5 |
| Laser Power (input) (watts) | 1500 | 1800 |
| Laser Power (output) (watts) | 1300 | 1300 |
| Absorbed Laser Power (Watts) | 200 | 500 |
| Mass of Powder Recovered | 3.4 | 5.0 |
| Run Duration (min.) | about 30 | <30 |
| Ultrasonic Transducer Power (Watts) | 2.3 | 4.6 | sccm = standard cubic centimeters per minute
slm = standard liters per minute
Argon - Win. = argon flow through inlets 330, 332
Argon - Sld. = argon flow through shielding gas conduits 365.
Laser Power (input) = Laser power input into reaction chamber.
Laser Power (output) = Laser power exiting the reaction chamber into the beam dump.

Powder manganese oxide was made at a rate of roughly 20 g/hr. The conditions specified in column 1 of Table 3 resulted in brown powder while the parameters specified in the second column of Table 3 resulted in yellow powder.

Figure 32:
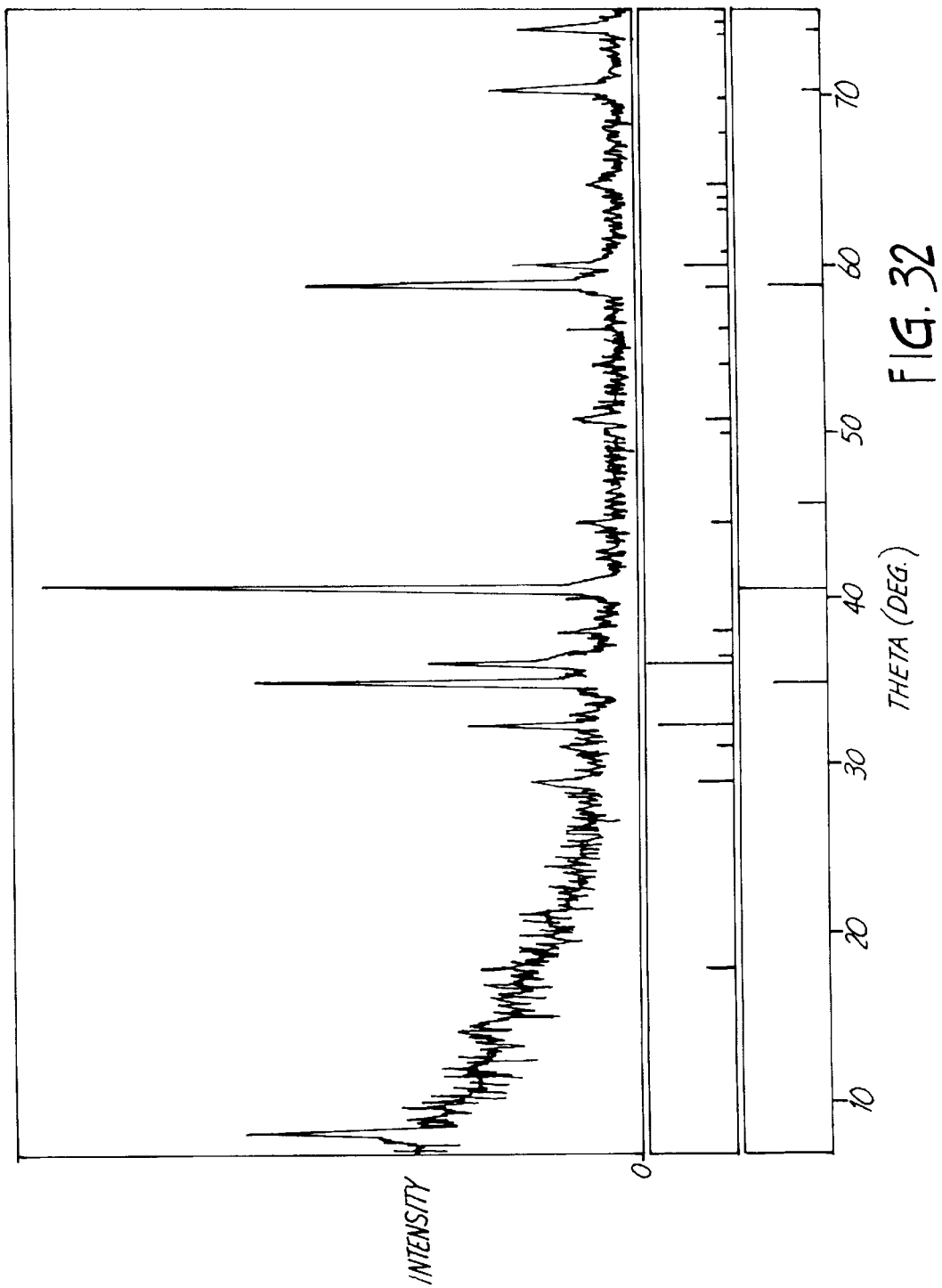
FIG. 32 is an x-ray diffractogram of manganese oxide nanoparticles produced by laser pyrolysis using with aerosol reactants according to the parameters specified in column 1 of Table 3.
Figure 33:
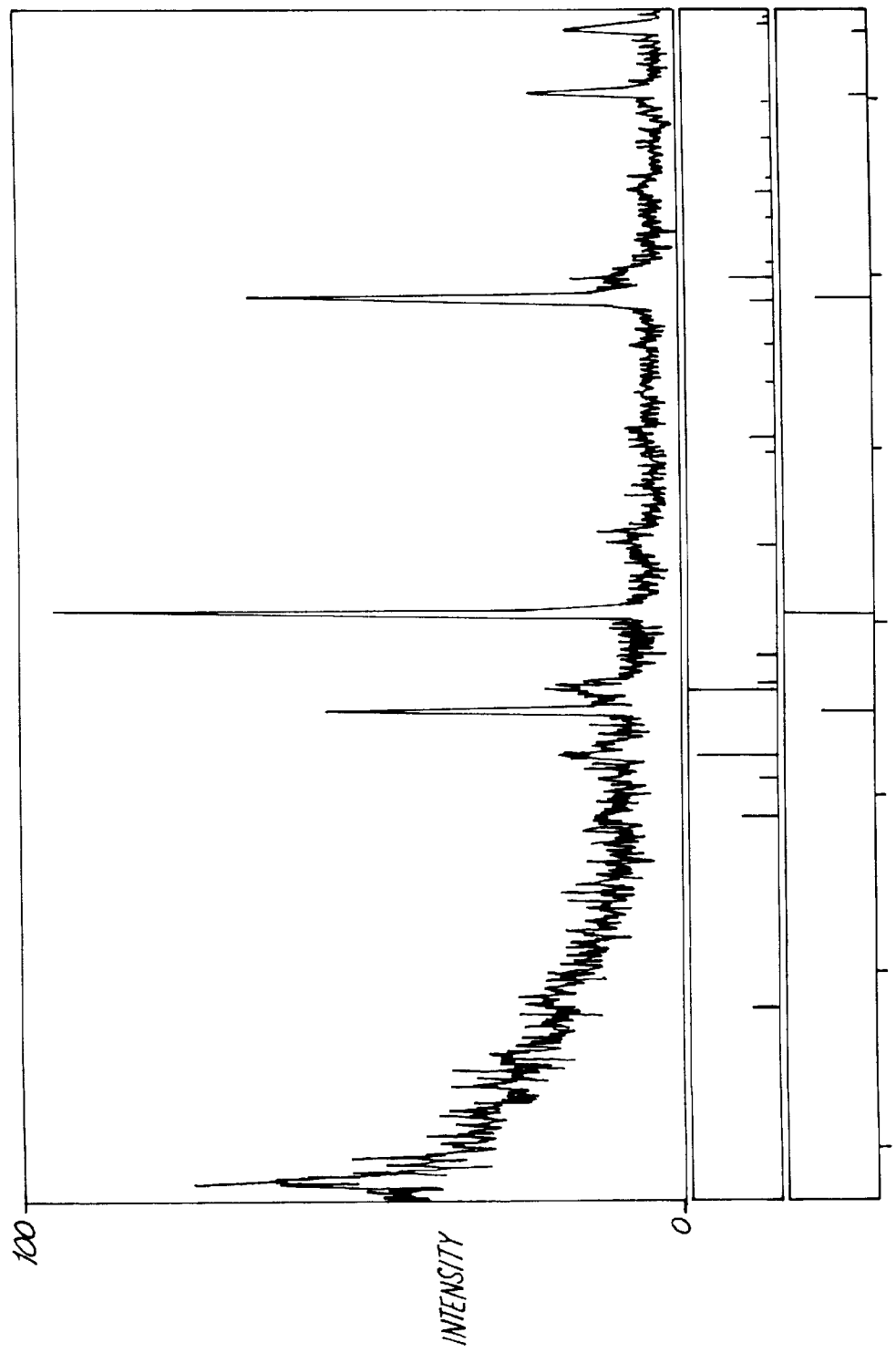
FIG. 33 is an x-ray diffractogram of manganese oxide nanoparticles produced by laser pyrolysis using with aerosol reactants according to the parameters specified in column 2 of Table 3.

To evaluate the atomic arrangement, the samples were examined by x-ray diffraction using the Cu(Kα) radiation line on a Siemens D500 x-ray diffractometer. X-ray diffractograms for a sample produced under the conditions specified in column 1 and column 2 of Table 3 is shown in FIGS. 32 and 33, respectively. The particles produced under the conditions in columns 1 and 2 of Table 3 had x-ray diffractograms indicating the presence of both manganosite (cubic) MnO and hausmannite $Mn_3O_4$.

Example 4
Lithium Manganese Oxide Particles by Laser Pyrolysis—Aerosol Metal Precursors The synthesis of manganese oxide/lithium manganese oxide particles described in this example was performed by laser pyrolysis. The particles were produced using essentially the laser pyrolysis apparatus of FIG. 2, described above, using the reactant delivery apparatus of FIG. 4.

The manganese chloride (Alfa Aesar, Inc., Ward Hill, Mass.) precursor and lithium chloride (Alfa Aesar, Inc.) precursor were dissolved into deionized water. The aqueous solution had a concentration of 4 molar LiCl and 4 molar $MnCl_2$. The aqueous solution with the two metal precursors was carried into the reaction chamber as an aerosol. $C_2H_4$ gas was used as a laser absorbing gas, and Argon was used as an inert gas. $O_2$, Ar and $C_2H_4$ were delivered into the gas supply tube of the reactant supply system. The reactant mixture containing $MnCl_2$, LiCl, Ar, $O_2$ and $C_2H_4$ was introduced into the reactant nozzle for injection into the reaction chamber. The reactant nozzle had an opening with dimensions of ⅝ in.×¹⁄₁₆ in. Additional parameters of the laser pyrolysis synthesis relating to the particles of Example 1 are specified in Table 4.

TABLE 4

| | 1 |
|---|---|
| Crystal Structure | Amorphous |
| Pressure (Torr) | 450 |

TABLE 4-continued

Figure 34:
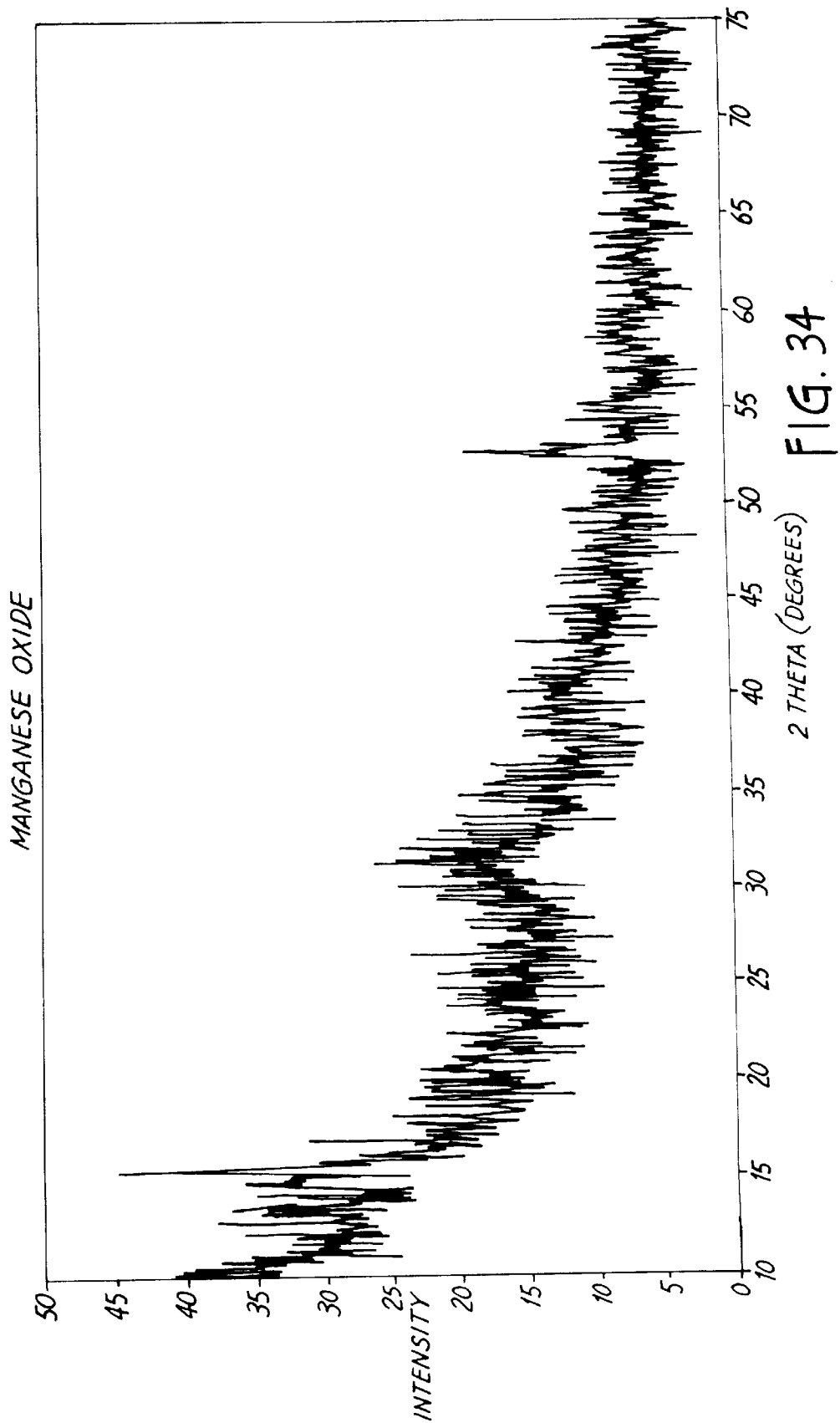
FIG. 34 is an x-ray diffractogram of nanoparticles of lithium manganese oxide produced by laser pyrolysis of a reactant stream with an aerosol.

| 1 | |
|---|---|
| Argon-Window (SCCM) | 700 |
| Argon-Shielding (SLM) | 5.6 |
| Ethylene (SLM) | 1.27 |
| Argon (SLM) | 1.46 |
| Oxygen (SLM) | 1.07 |
| Laser Output (Watts) | 590 |
| Li Precursor | 4 M Lithium Chloride |
| Mn Precursor | 4 M Manganese Chloride |
| Precursor Temperature ° C. | Room Temperature | sccm = standard cubic centimeters per minute
slm = standard liters per minute
Argon - Win. = argon flow through inlets 216, 218
Argon - Sld. = argon flow through annular channel 142.
Argon = Argon directly mixed with the aerosol The production rate of manganese oxide/lithium manganese oxide particles was typically about 1 g/hr. To evaluate the atomic arrangement, the samples were examined by x-ray diffraction using the Cu(Kα) radiation line on a Siemens D500 x-ray diffractometer. X-ray diffractograms for a sample produced under the conditions specified in Table 4 is shown in FIG. 34. The x-ray diffractogram shown in FIG. 34 indicates that the sample was amorphous. In particular, a broad peak from about 27° to about 35° corresponds to the amorphous lithium manganese oxide. A sharp peak at about 15° is due to the presence of a trace amount of manganese chloride contamination. A sharp peak at 53° is due to a trace amount of an unidentified contaminant.

Example 5
Heat Treatment of Lithium Manganese Oxide Particles Produced by Laser Pyrolysis A sample of manganese oxide/lithium manganese oxide nanoparticles produced by laser pyrolysis according to the conditions specified in the Example 4 were heated in an oven under oxidizing conditions. The oven was essentially as described above with respect to FIG. 22. Between about 100 and about 300 mg of nanoparticles were placed in an open 1 cc vial within the quartz tube projecting through the oven. Oxygen gas was flowed through a 1.0 inch diameter quartz tube at a flow rate of 308 cc/min. The oven was heated to about 400° C. The particles were heated for about 16 hours.

Figure 35:
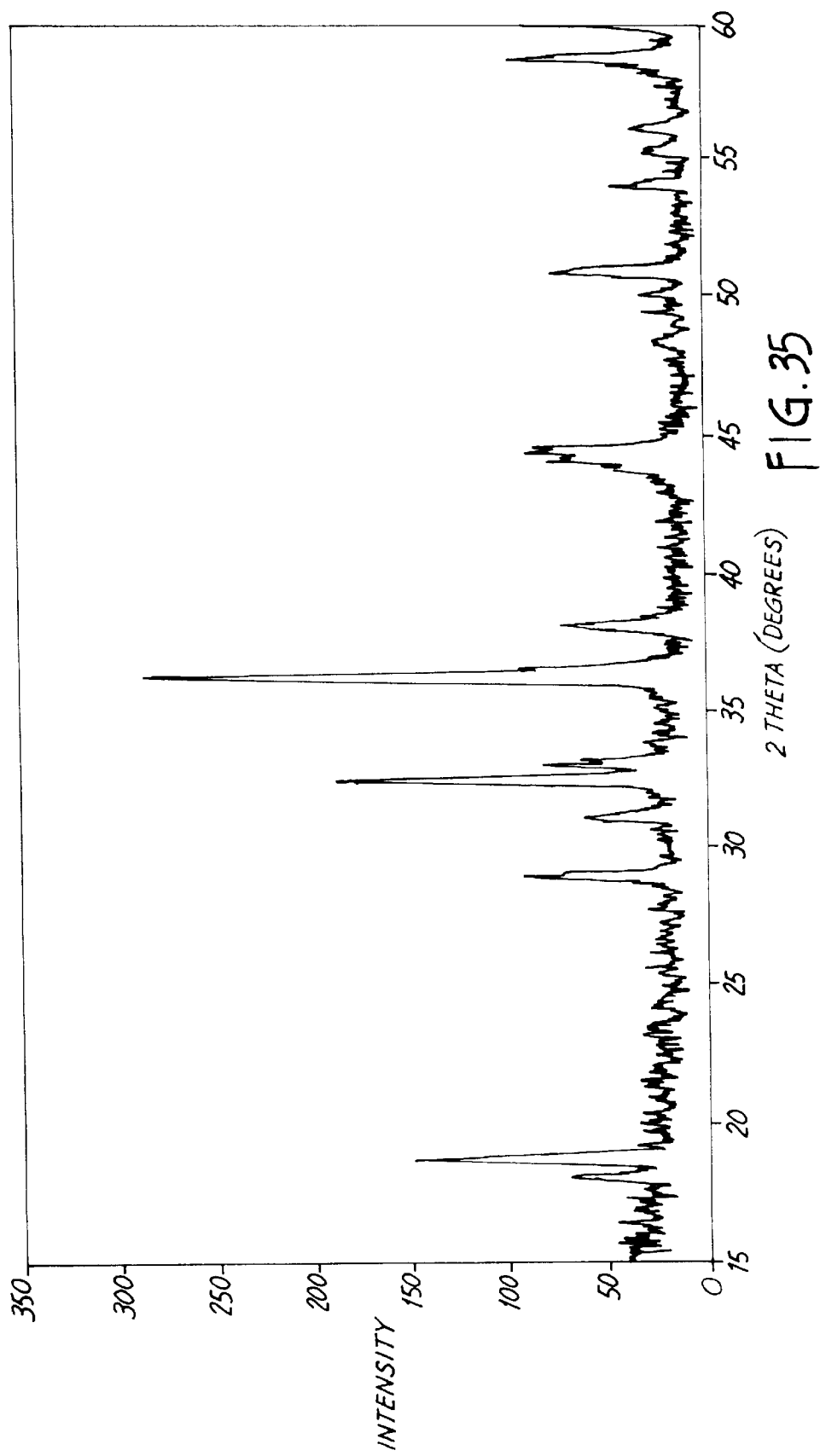
FIG. 35 is an x-ray diffractogram of nanoparticles of lithium manganese oxide made by laser pyrolysis following heating in an oven.

The crystal structure of the resulting heat treated particles were determined by x-ray diffraction. The x-ray diffractogram for heated sample is shown in FIG. 35. The x-ray diffractogram shown in FIG. 35 indicates that the collection of particles involved mixed phase material with major components of $LiMn_2O_4$ (about 60% by volume) and $Mn_3O_4$ (about 30% by volume) and a minor component of $Mn_2O_3$ (about 10% by volume). The $LiMn_2O_4$ compound has a cubic spinel crystal structure. It is possible that the sample included additional amorphous phases of materials. In particular, based on the amount of lithium introduced in the reactant stream, the sample presumably contains additional lithium that is not identified in the crystalline phases.

Example 6
Lithium Incorporation Into Manganese Oxide Particles

Manganese oxide particles produced as described in Example 3 were further treated to form lithium manganese oxide. The manganese oxide particles used were a mixture of particles formed under the conditions for the synthesis specified in columns 1 and 2 of Table 3. About 2.0 grams of nanocrystalline manganese oxide was mixed with about 1.2 grams of lithium nitrate, $LiNO_3$ (Alfa Aesar, Inc., Ward Hill, Mass.). The mixtures were heated in an oven under either pure $O_2$ or under pure Ar. The oven was essentially as described above with respect to FIG. 22. The mixture of nanocrystalline manganese oxide and lithium nitrate were placed in an alumina boat within the quartz tube projecting through the oven. The selected gas was flowed through a 1.0 inch diameter quartz tube at a flow rate of about 40 cc/min. The oven was heated to about 400° C. The particles were heated for about 16 hours.

Three samples were treated. The first sample had a weight ratio of 1.84 parts nanocrystalline MnO to 1 part $LiNO_3$. The second sample had a weight ratio of 1.66 parts nanocrystalline MnO to 1 part $LiNO_3$. Samples 1 and 2 were heat treated under a flow of oxygen gas. Sample 3 had a weight ratio of 1.63 parts nanocrystalline MnO to 1 part $LiNO_3$. Sample 3 was heat treated under a flow of argon gas.

Figure 36:
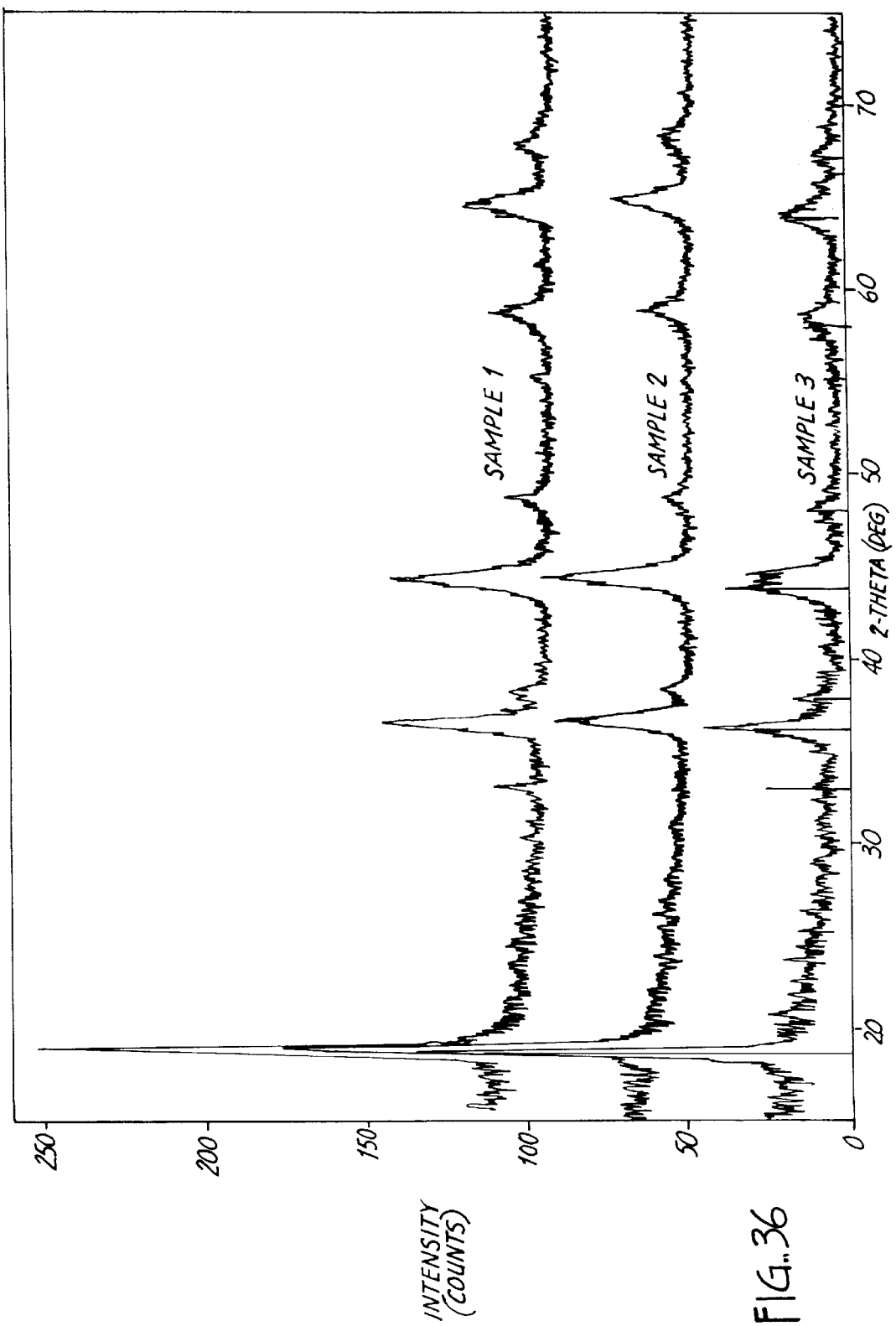
FIG. 36 is a plot of three x-ray diffractograms for three samples of lithium manganese oxide produced by heat treating mixtures of nanocrystalline manganese oxide and lithium nitrate.

To evaluate the crystal structure of the materials following heat treatment, the samples were examined by x-ray diffraction using the Cu(Kα) radiation line on a Siemens D5000 x-ray diffractometer. The x-ray diffraction spectra for samples 1–3 are depicted in FIG. 36. The spectrum for sample 1 has peaks corresponding to unreacted manganese oxide. By decreasing the manganese oxide to lithium nitrate ratio from 1.84 to 1.66, complete reaction of the manganese oxide was observed. The lithium manganese oxide of sample 2 had a lattice parameter of approximately 8.17 Å, which is similar to that of defect spinel $Li_2Mn_4O_9$. The lithium manganese oxide of sample 3 had a lattice parameter of approximately 8.23 Å, which is similar to the lattice parameter of $LiMn_2O_4$.

Figure 37:
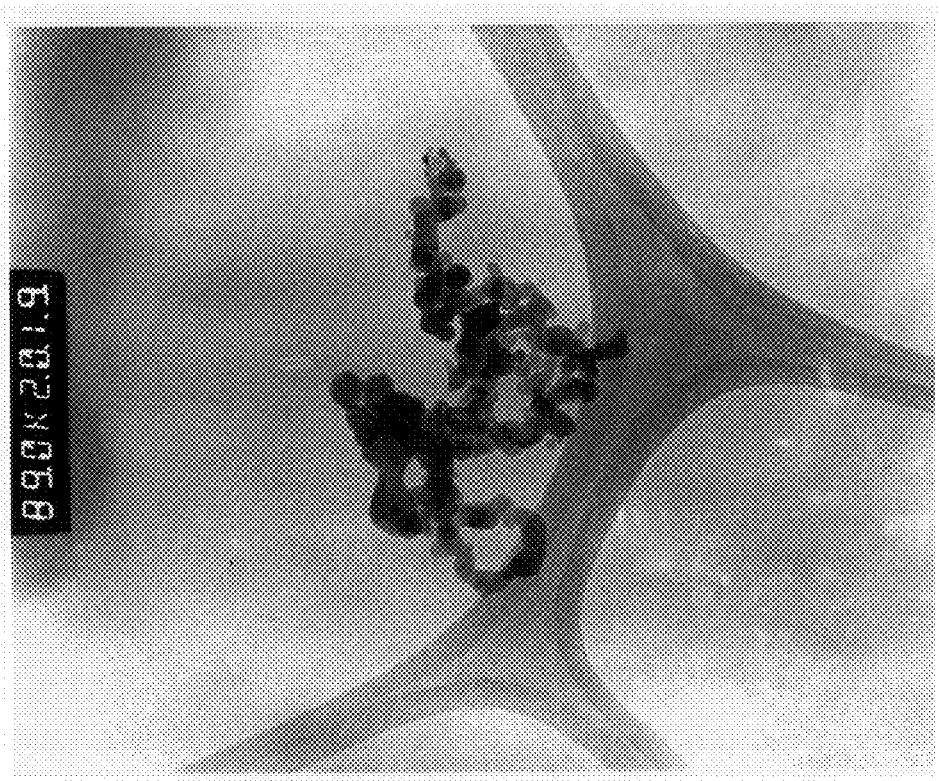
FIG. 37 is a transmission electron micrograph of manganese oxide nanoparticles used for further heating processing into lithium manganese oxide.
Figure 38:
FIG. 38 is a transmission electron micrograph of lithium manganese oxide nanoparticles from sample 1.

Transmission electron microscopy (TEM) was used to determine particle sizes and morphology of the lithium manganese oxide and the manganese oxide starting materials. A TEM micrograph for the manganese oxide nanoparticle starting material is shown in FIG. 37. A TEM micrograph for the lithium manganese oxide is shown in FIG. 38. Note that the particle size did not change significantly, if at all, during the heating process. Due to the lack of optimization of the aerosol conditions, the particles of manganese oxide displayed in FIG. 37 have a broader particle size distribution than found for manganese oxide in Examples 1 and 2 above. Since the incorporation of lithium into the manganese oxide nanoparticles does not significantly change the size of the particles, lithium manganese oxide nanoparticles with a narrow size distribution can be made using the manganese oxide nanoparticles described above.

BATTERY EXAMPLES

In addition, lithium manganese oxide based lithium batteries were evaluated to determine the charge capacity and energy density of the lithium manganese oxide powders used as active materials in the positive electrodes. The batteries tested in the following examples were all produced following a common procedure. The lithium manganese oxide powders (LMO) were mixed with a conductive acetylene black powder (AB) (Catalog number 55, Chevron Corp.) at a ratio of 80:10. The powder mixture was ground with a mortar and pestle to thoroughly mix the powders.

A few drops of polytetrafluoroethylene (PTFE) solution were added to the homogeneous powder mixture. The 10 percent PTFE solution included PTFE (Aldrich Chemical Co., Milwaukee, Wis.) solution in water. The final ratio of LMO:AB:PTFE was 80:10:10. A small amount of methyl alcohol (Aldrich Chemical Co., Milwaukee, Wis.) was added to the mixture. In addition, isopropyl alcohol (Aldrich Chemical Co., Milwaukee, Wis.) was added to cover the mixture.

The slurry was put in a blended to mix thoroughly, and the solution was passed through a vacuum filter to remove the solvents. The resulting powder mixture was needed and rolled to a 5-mil thickness. An aluminum mesh (Dekler, Branford Conn.) was placed on the mixture, and further rolled down to achieve a final thickness with the mesh of 5 mils. The mixture with the aluminum mesh was baked in a vacuum oven for two hours at 250° C. to remove residual solvent and to melt the PTFE. After removal from the oven, the electrodes were punched to 16 mm and pressed at 5000 lbs of pressure. The punched out electrodes were placed again in the vacuum oven overnight at 120° C. to remove residual moisture. After removal from the oven, the electrodes were immediately placed in a glove box (Vacuum Atmosphere Co., Hawthorne, Calif.) under an argon atmosphere. In the glove box, the electrodes were weighted and measured for thickness.

Figure 39:
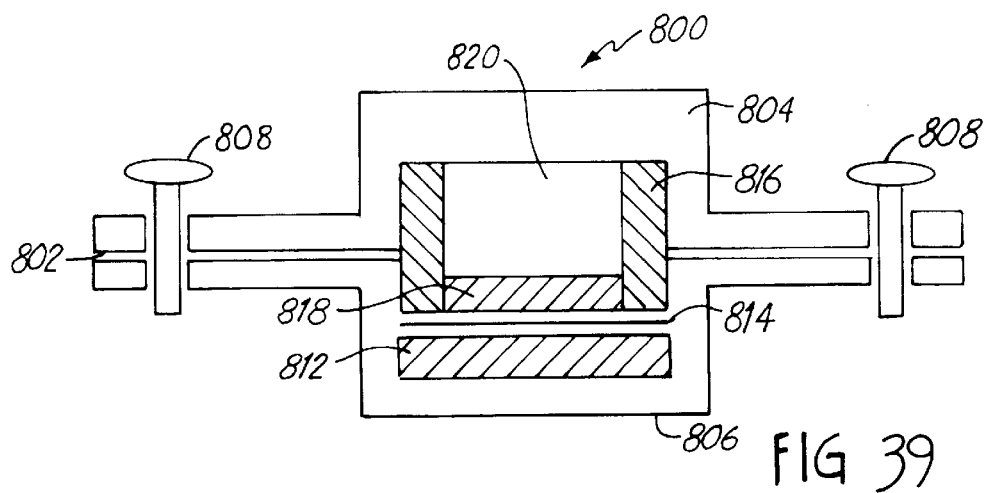
FIG. 39 is a schematic, perspective view of the three electrode arrangement used in the examples.

The samples were tested in an cell 800 with an airtight two-electrode configuration shown in FIG. 39. The casing 802 for the sample battery was obtained from Hohsen Co., Osaka, Japan. The casing included a top portion 804 and a bottom portion 806, which are secured with four screws 808. The two other screws not shown in FIG. 38 are behind the two screws shown. Lithium metal (Alfa/Aesar, Ward Hill, Mass.) was used as a negative electrode 812. Negative electrode 812 was placed within the bottom portion 806. A separator 814, Celgard® 2400 (Hoechst Celanese, Charlotte, N.C.), was placed above the lithium metal. A Teflon® ring 816 was placed above separator 814. A positive electrode 818 was placed mesh side up within Teflon® ring 816. An aluminum pellet 820 was placed above positive electrode 818, and electrolyte was added. The electrolyte from EM Industries (Hawthorne, N.Y.) was 1M $LiPF_6$ in 1:1 ethylene carbonate/dimethyl carbonate. A Teflon® o-ring is located between top portion 804 and bottom portion 806 to electrically insulate the two electrodes. Similarly, screws 808 are placed within a Teflon® sleeve to electrically insulate screws 808 from top portion 804 and bottom portion 806. Electrical contact between the battery tester and cell 800 is made by way of top portion 804 and bottom portion 806.

The samples were tested with a discharge/charge rate at a constant current of 0.5 $mA/cm^2$, and cycled between 2.5V to 4.4V, or 2.2V to 3.3V, or 3.5V to 4.4V at 25° C. The measurements were controlled by an Arbin Battery Testing System, Model BT4023, from Arbin Instruments, College Station, Tex. The charging/discharging profiles were recorded, and the discharge capacity of the active material was obtained.

The energy density is evaluated by the integral over the discharge time of the voltage multiplied by the current divided by the mass of the active material. The current during testing was 1 mA, corresponding to a current density of 0.5 $mA/cm^2$. The active material mass ranged from about 30 to about 50 mg.

Example 7
Four Volt Cycling Behavior

Figure 40:
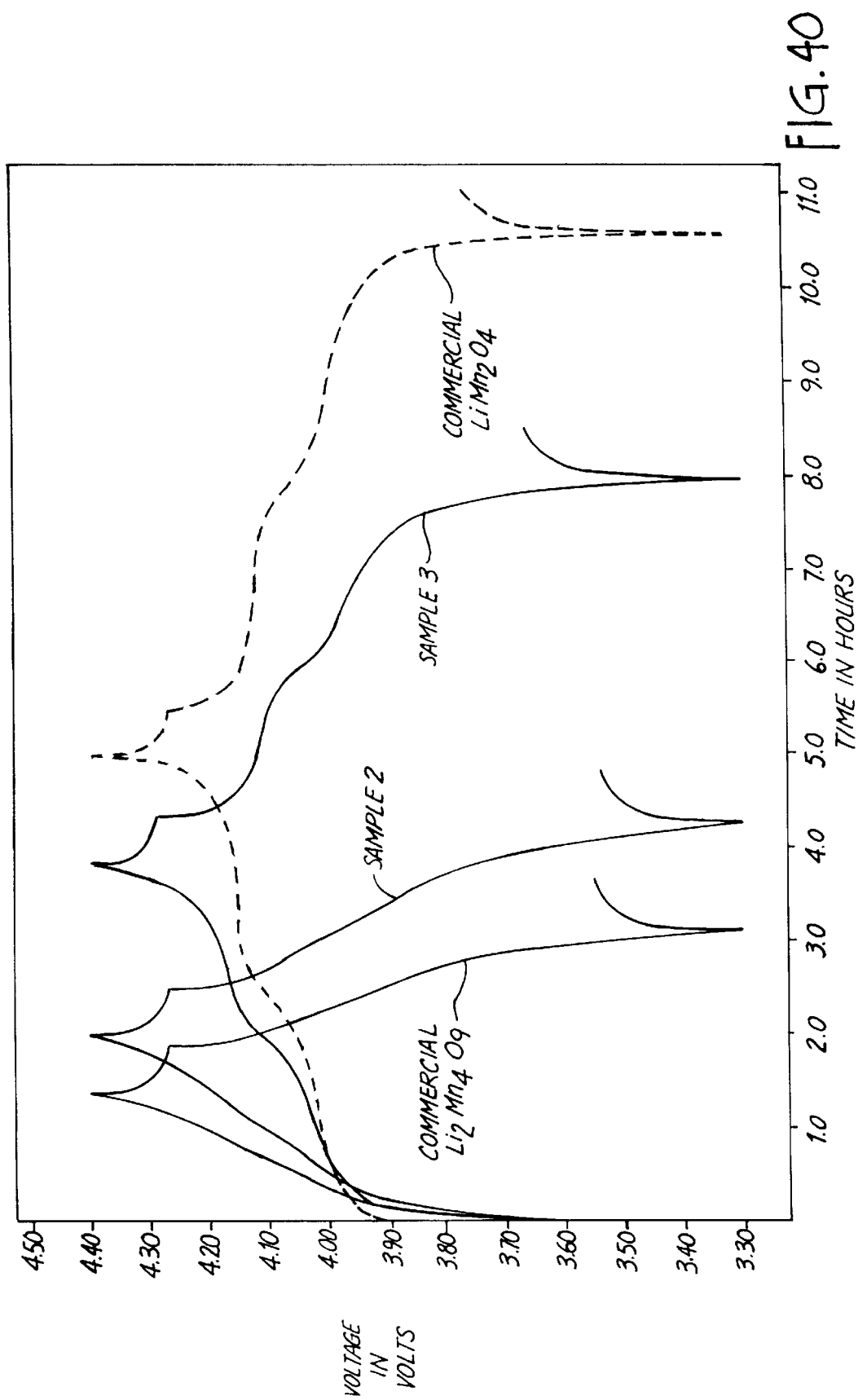
FIG. 40 is a plot of cell voltage in a range of four volts for four different positive electrode active materials.

This example explores the four volt cycling behavior of four different lithium manganese oxide materials. Cells were produced following the procedure outlined above with material produced as sample 2 and sample 3 of Example 6. For comparison, cells were also produced using standard $LiMn_2O_4$ and $Li_2Mn_4O_9$. Commercial $LiMn_2O_4$ was purchased from Alfa Aesar, a Johnson Matthey Company, Ward Hill, Mass. $Li_2Mn_4O_9$ (standard $Li_2Mn_4O_9$) was synthesized using a standard procedure based on heating a mixture of manganese carbonate and lithium carbonate at about 400° C. for about 60 hours. The cycling behavior in the four volt range was examined by charging the material to a voltage of 4.40 volts and allowing the material to discharge. The resulting discharge curve is shown in FIG. 40. In FIG. 40, the cycling behavior of cells made with nanoparticles from Example 6 are labelled sample 2 and sample 3, appropriately, and the cycling behavior of cells made with the commercial or standard powders are labelled by their stoichiometry with the notation "Commercial". Note that the cell with sample 2 had a discharge curve similar to the $Li_2Mn_4O_9$ commercial material, and the cell with sample 3 had a discharge curve similar to $LiMn_2O_4$ commercial material.

Example 8
Three Volt Cycling Behavior

Figure 41:
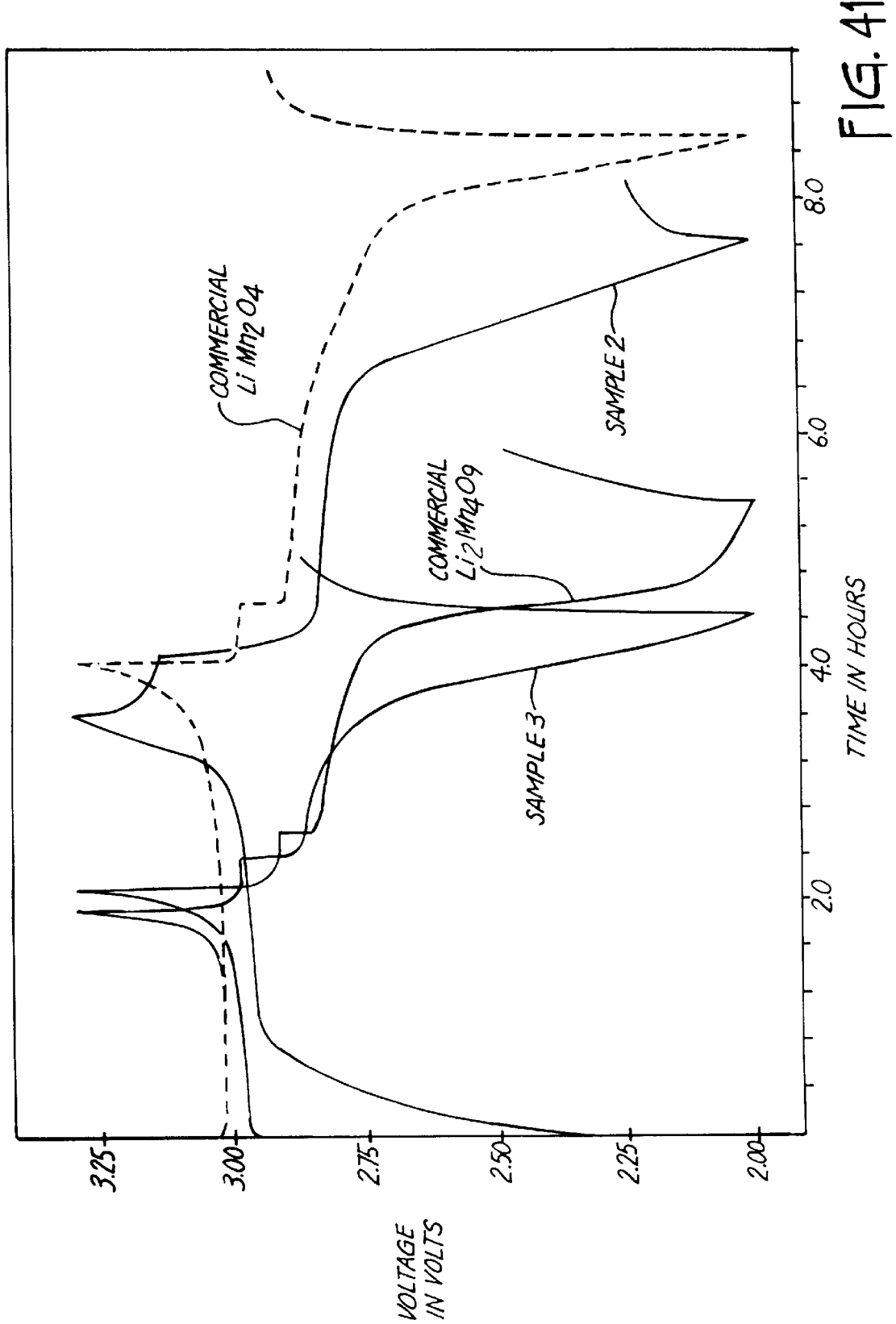
FIG. 41 is a plot of cell voltage in a range of three volts for four different positive electrode active materials.

This example explores the three volt cycling behavior of four different lithium manganese oxide materials. Cells were produced following the procedure outlined above with material produced as sample 2 and sample 3 of Example 6. For comparison, cells were also produced using commercial $LiMn_2O_4$ and $Li_2Mn_4O_9$. The cycling behavior in the three volt range was examined by charging the material to a voltage of 3.30 volts and allowing the material to discharge. The resulting discharge curve is shown in FIG. 41. In FIG. 41, the cycling behavior of cells made with nanoparticles from Example 6 are labelled sample 2 and sample 3, appropriately, and the cycling behavior of cells made with the commercial powders are labelled by their stoichiometry with the notation "Commercial". Note that the cell with sample 2 had an insertion potential similar to the $Li_2Mn_4O_9$ commercial material, and the cell with sample 3 had a insertion potential similar to $LiMn_2O_4$ commercial material.

Example 9
Cycling Properties

Figure 42:
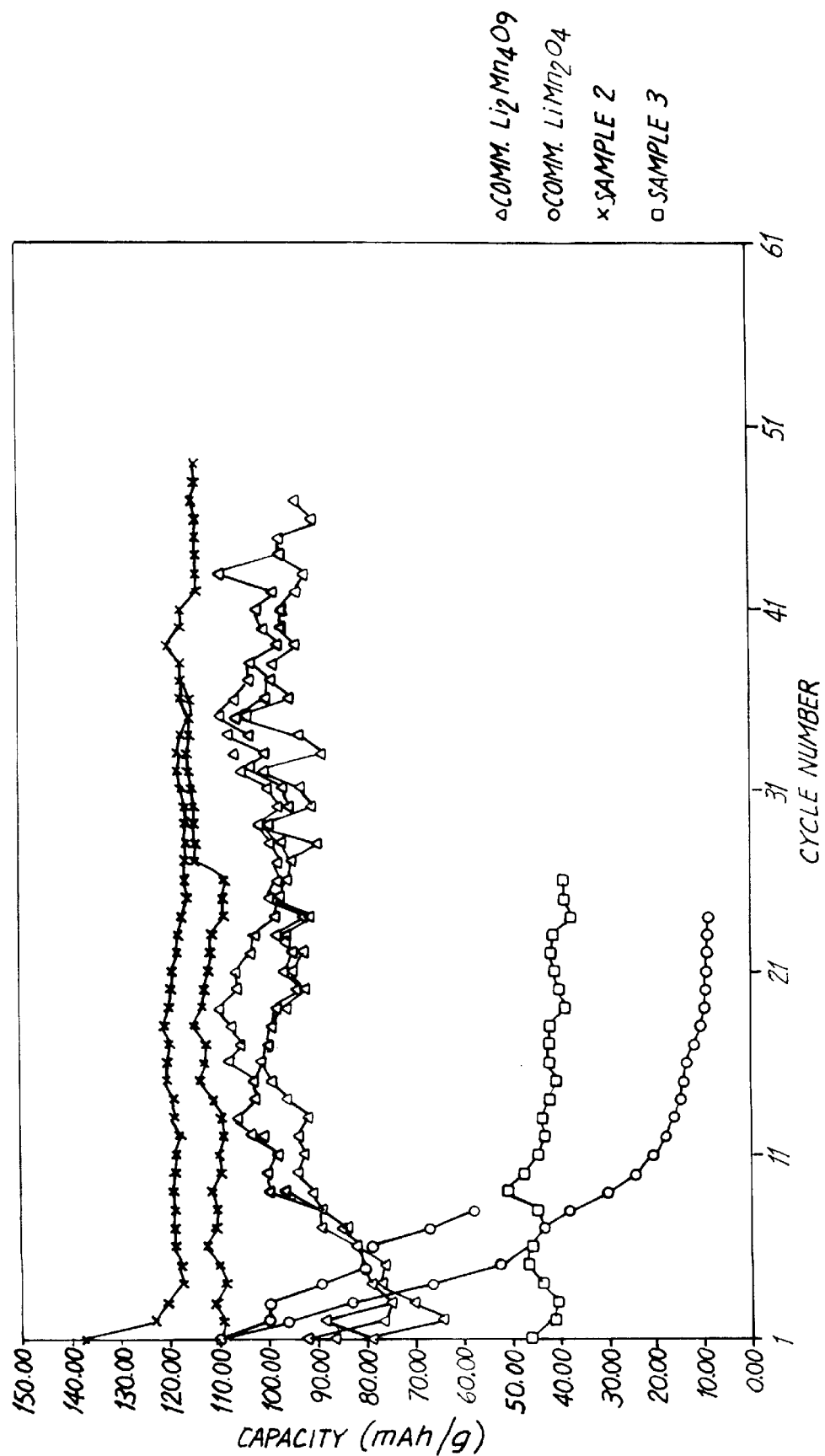
FIG. 42 is a plot of capacity as a function of cycle number for eight different cells produced with four different positive electrode active materials.

The cycling behavior of cells made as described above was explored for four different positive electrode materials. Cells were produced following the procedure outlined above with material produced as sample 2 and sample 3 of Example 6. For comparison, cells were also produced using commercial $LiMn_2O_4$ and $Li_2Mn_4O_9$. Cells with positive electrode materials from sample 1 and commercial $LiMn_2O_4$ were produced and run in duplicates. Only one cell was produced with the sample 3 materials, while three cells with commercial $Li_2Mn_4O_9$ were produced and run. For each cycle, the capacity in mAh/g were evaluated. The cells were cycled between about 3.3 volts and 2.0 volts. The results are plotted in FIG. 42.

The embodiments described above are intended to be illustrative and not limiting. Additional embodiments are within the claims below. Although the present invention has been described with reference to preferred embodiments, workers skilled in the art will recognize that changes may be made in form and detail without departing from the spirit and scope of the invention.

What is claimed is:

1. A collection of particles comprising lithium manganese oxide, the collection of particles having an average diameter less than about 250 nm, wherein the collection of particles have a distribution of particle sizes in which at least about 95 percent of the particles have a diameter greater than about 40 percent of the average diameter and less than about 160 percent of the average diameter.

2. The collection of particles of claim 1 wherein the collection of particles have an average diameter from about 5 nm to about 100 nm.

3. The collection of particles of claim 1 wherein the collection of particles have an average diameter from about 5 nm to about 25 nm.

4. The collection of particles of claim 1 wherein the lithium manganese oxide has an approximate stoichiometry of $LiMn_2O_x$, where $x \geq 3.8$.

5. The collection of particles of claim 1 wherein the lithium manganese oxide has a cubic spinel crystal structure.

6. The collection of particles of claim 1 wherein the collection of particles includes effectively no particles with a diameter greater than about four times the average diameter.

7. The collection of particles of claim 1 wherein the collection of particles have a distribution of particle sizes in which at least about 95 percent of the particles have a diameter greater than about 60 percent of the average diameter and less than about 140 percent of the average diameter.

8. A method of making lithium manganese oxide particles comprising heating a mixture of manganese monoxide (MnO) particles and a lithium compound, the manganese monoxide particles having an average diameter less than about 250 nm.

9. The method of claim 8 wherein the lithium compound comprises $LiNO_3$.

10. The method of claim 8 wherein the heating is performed at a temperature from about 200 to about 600° C.

11. The method of claim 8 wherein the heating is performed under an atmosphere comprising $O_2$.

12. The method of claim 8 wherein the lithium manganese oxide has a cubic spinel crystal structure.

13. A method of making lithium manganese oxide particles comprising heating a mixture of particles of a manganese oxide and a lithium compound, the particles of manganese oxide having an average diameter less than about 250 nm, wherein the resulting lithium manganese oxide particles have a distribution of particle sizes in which at least about 95 percent of the particles have a diameter greater than about 40 percent of the average diameter and less than about 160 percent of the average diameter.

14. The method of claim 13 wherein the lithium manganese oxide particles have an average diameter from about 5 nm to about 100 nm.

15. The method of claim 13 wherein the heating is performed at a temperature from about 200° C. to about 500° C.

16. The method of claim 13 wherein the lithium manganese oxide particles have a cubic spinel crystal structure.

17. The method of claim 13 wherein the manganese compound comprises a manganese oxide, with the manganese in an oxidation state from +2 to +4.

18. A collection of particles comprising lithium manganese oxide, the collection of particles having an average diameter from about 5 nm to about 50 nm, the lithium manganese oxide comprising $Li_2Mn_4O_9$.

19. The collection of particles of claim 18 wherein the collection of particles have a distribution of particle sizes such that at least about 95 percent of the particles have a diameter greater than about 40 percent of the average diameter and less than about 160 percent of the average diameter.

20. A collection of particles comprising lithium manganese oxide, the collection of particles having an average diameter less than about 250 nm, the lithium manganese oxide having a lattice parameter along axis a of no more than 8.23 angstroms.

21. The collection of particles of claim 20 wherein the collection of particles have an average diameter from about 5 nm to about 50 nm.

22. A collection of particles comprising lithium manganese oxide, the collection of particles having an average diameter less than about 250 nm, the lithium manganese oxide comprising $Li_2Mn_4O_9$, wherein the collection of particles have a distribution of particle sizes such that at least about 95 percent of the particles have a diameter greater than about 40 percent of the average diameter and less than about 160 percent of the average diameter.

* * * * *

UNITED STATES PATENT AND TRADEMARK OFFICE
CERTIFICATE OF CORRECTION

PATENT NO. : 6,136,287
DATED : October 24, 2000
INVENTOR(S) : Horne et al.

It is certified that error appears in the above-identified patent and that said Letters Patent is hereby corrected as shown below:

Column 30,
Line 37, add claim 23
 -- 23. The collection of particles of claim 20 wherein the collection of particles have a distribution of particle sizes such that at least about 95 percent of the particles have a diameter greater than about 40 percent of the average diameter and less than about 160 percent of the average diameter. --

Signed and Sealed this

Fourteenth Day of September, 2004

JON W. DUDAS
*Director of the United States Patent and Trademark Office*